US008708241B2

(12) United States Patent
DeJean et al.

(10) Patent No.: US 8,708,241 B2
(45) **Date of Patent: *Apr. 29, 2014**

(54) RADIO FREQUENCY CERTIFICATES OF AUTHENTICITY AND RELATED SCANNERS

(75) Inventors: Gerald R DeJean, Los Angeles, CA (US); Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/633,289

(22) Filed: Dec. 8, 2009

(65) Prior Publication Data

US 2010/0127823 A1 May 27, 2010

Related U.S. Application Data

(63) Continuation of application No. 11/565,398, filed on Nov. 30, 2006, now Pat. No. 7,659,851.

(60) Provisional application No. 60/743,118, filed on Jan. 11, 2006.

(51) Int. Cl.
*G06K 19/06* (2006.01)

(52) U.S. Cl.
USPC .......................................... 235/494; 235/492

(58) Field of Classification Search
USPC .......... 343/703; 235/375, 487, 380, 491, 492, 235/493, 494
See application file for complete search history.

(56) References Cited

U.S. PATENT DOCUMENTS

| | | | | |
|---|---|---|---|---|
| 5,450,090 | A | 9/1995 | Gels et al. | |
| 5,581,257 | A * | 12/1996 | Greene et al. | 342/51 |
| 7,106,199 | B2 | 9/2006 | Lee et al. | |
| 7,345,647 | B1 | 3/2008 | Rodenbeck | |
| 2004/0001568 | A1 | 1/2004 | Impson et al. | |
| 2004/0066273 | A1 | 4/2004 | Cortina et al. | |
| 2004/0132406 | A1 | 7/2004 | Scott et al. | |
| 2005/0156318 | A1 | 7/2005 | Douglas | |
| 2005/0280539 | A1* | 12/2005 | Pettus | 340/572.1 |
| 2006/0028343 | A1* | 2/2006 | Taylor et al. | 340/572.1 |
| 2006/0259304 | A1 | 11/2006 | Barzilay | |
| 2007/0132640 | A1 | 6/2007 | Kim et al. | |
| 2008/0210757 | A1* | 9/2008 | Burden et al. | 235/449 |

FOREIGN PATENT DOCUMENTS

WO WO03023900 A1 3/2003

* cited by examiner

*Primary Examiner* — Robert Karacsony
(74) *Attorney, Agent, or Firm* — Stephen A. Wight; Carole Boelitz; Micky Minhas

(57) ABSTRACT

Radio frequency certificates of authenticity (RFCOAs) and associated scanners and methods are presented. In one implementation, an array of miniaturized antenna elements in an RFCOA scanner occupies an area smaller than a credit card yet obtains a unique electromagnetic fingerprint from an RFCOA associated with an item, such as the credit card. The antenna elements are miniaturized by a combination of both folding and meandering the antenna patch components. The electromagnetic fingerprint of an exemplary RFCOA embeddable in a credit card or other item is computationally infeasible to fake, and the RFCOA cannot be physically copied or counterfeited based only on possession of the electromagnetic fingerprint.

19 Claims, 14 Drawing Sheets

702

704

RADIO FREQUENCY CERTIFICATES OF AUTHENTICITY AND RELATED SCANNERS

RELATED APPLICATIONS

This application claims priority to U.S. patent application Ser. No. 11/565,398 to Gerald DeJean and Darko Kirovski, entitled, "Radio Frequency Certificates of Authenticity and Related Scanners," filed on Nov. 30, 2006, which claimed priority to U.S. Provisional Patent Application No. 60/743, 118 to Gerald DeJean and Darko Kirovski, entitled, "Making RFIDs Unique—Radio Frequency Certificates of Authenticity," filed on Jan. 11, 2006 and incorporated herein by reference, which is also related to U.S. patent application Ser. No. 11/170,720 to Gerald DeJean and Darko Kirovski, entitled, "Radio Frequency Certificates of Authenticity," filed on Jun. 29, 2005. Each of the aforementioned applications are incorporated herein by reference.

BACKGROUND

Counterfeiting is as old as the human desire to create objects of value. For example, historians have identified counterfeit coins as old as the corresponding originals. Test cuts into the coins were likely the first counterfeit detection procedure—with an objective of testing the purity of the inner metal of the minted coin. Then, the appearance of counterfeit coins with pre-engraved fake test cuts initiated the cat-and-mouse game of counterfeiters versus original manufacturers that has lasted to the present day.

It is difficult to assess and quantify the magnitude of the market for counterfeit objects of value today. There is a burgeoning market in some counterfeit objects, such as credit cards. In one illicit method-of-operation, when a credit card number, name, and expiration date are known, fake credit cards are sometimes manufactured in one country, used to buy goods in another, and the goods returned to the first country. Further, with on-line marketing tools, selling counterfeit objects has never been easier. Besides counterfeiting within financial and economic sectors, other sectors under attack include the software, hardware, pharmaceutical, entertainment, and fashion industries. According to a 2000 study by International Planning & Research, software piracy resulted in the loss of 110,000 jobs in the U.S., nearly U.S. $1.6 billion in tax revenues, and U.S. $5.6 billion in wages. Similarly, according to pharmaceutical companies, over 10% of all medications sold worldwide are counterfeit. Consequently, there exists a demand for technologies that can resolve these problems by guaranteeing the authenticity of an object and by narrowing down the search for the origins of piracy.

SUMMARY

Radio frequency certificates of authenticity (RFCOAs) and associated scanners are presented. In one implementation, an array of miniaturized antenna elements in an RFCOA scanner occupies an area smaller than a credit card yet obtains a unique electromagnetic fingerprint from an RFCOA associated with an item, such as the credit card. The antenna elements are miniaturized by a combination of both folding and meandering the antenna patch components. The electromagnetic fingerprint of an exemplary RFCOA embeddable in a credit card or other item is computationally infeasible to fake, and the RFCOA cannot be physically copied or counterfeited based only on possession of the electromagnetic fingerprint.

This summary is provided to introduce exemplary radio frequency certificates of authenticity and related scanners, which are further described below in the Detailed Description. This summary is not intended to identify essential features of the claimed subject matter, nor is it intended for use in determining the scope of the claimed subject matter.

DETAILED DESCRIPTION

Overview

Figure 1:
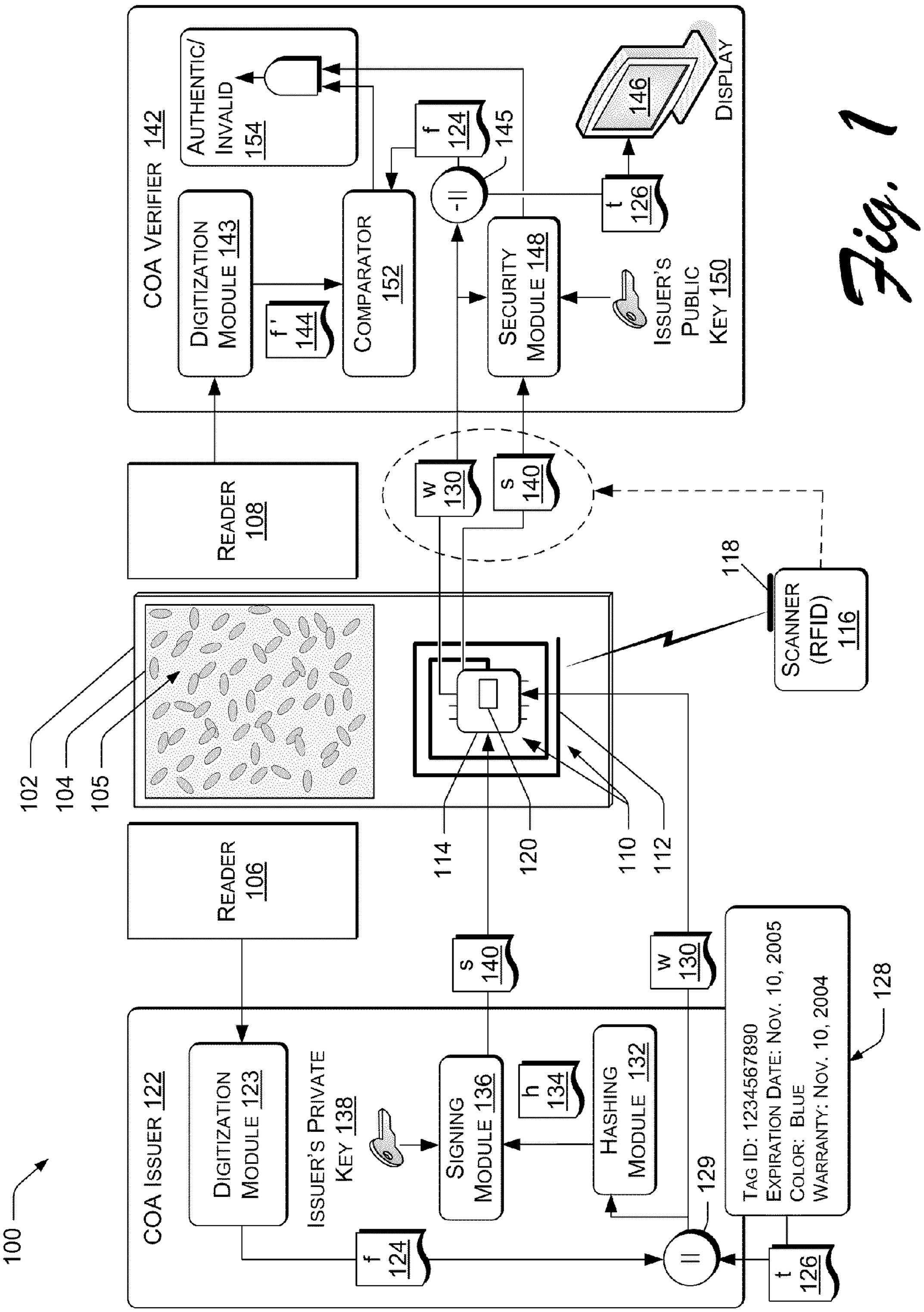
FIG. 1 is a block diagram of an exemplary authentication system that uses radio frequency certificates of authenticity (RFCOAs).

Described herein are "radio frequency (RF) certificates of authenticity" (RFCOAs) and related scanners that read the RFCOAs. "Scanner" and "reader" are used interchangeably herein. In the present context, a certificate of authenticity (COA) is a physical object (such as a seal, tag, label, ID patch, part of a product, piece of material, etc.) that can prove its own authenticity and often prove the authenticity of an attached or associated item. Exemplary designs described herein are for objects that behave as COAs in an electromagnetic field, e.g., when exposed electromagnetic radiation such as RF energy, and for arrays of miniaturized antennae that are capable of reading an RFCOA.

Ideally, an RFCOA is extremely inexpensive to manufacture. An agent in each RFCOA interacts with RF energy to provide a unique electromagnetic fingerprint, but the cost of the agent is typically negligible. The agent may be pieces of a conducting material or dielectric. The types and amounts of raw materials used in RFCOAs and their scanners are typically low cost. However, because each RFCOA instance possesses a random unique structure (the source of a unique electromagnetic fingerprint) it is almost always infeasible or prohibitively expensive for an adversary—e.g., a credit card counterfeiter—to reproduce an RFCOA with enough exactitude to successfully mimic the electromagnetic fingerprint that certifies authenticity.

The electromagnetic RF fingerprint of an RFCOA instance consists of a set of scattering parameters ("s-parameters") of deflected RF energy observed over a specific frequency band. The deflected RF energy is collected for all the possible antennae couplings (or a subset thereof) on a RFCOA reader that consists of a matrix or array of individual antennae for transmitting and receiving the RF energy to and from an RFCOA instance.

The unique electromagnetic fingerprint arises from reflection, refraction, absorption, etc., of the RF energy when it interacts with the materials of the agent selected for the manufacture of an RFCOA that are not only randomly affixed in 3-dimensional space but also have intrinsic physical properties that produce other various electromagnetic effects by various mechanisms: reflectance, refractance, dielectric influences; and also impedance, capacitance, reactance, inductance, etc., effects when impinged by RF radiation.

It should be noted that the electromagnetic fingerprint of an RFCOA appears different to each different type of scanner used to read the RFCOA, even though the fingerprint is reproducible between the same RFCOA instance and the same configuration of scanner. This is an effect crudely analogous to visible light playing on pieces of broken glass—the scattering effect observed depends on the observation point(s). In the case of an RFCOA, RF energy is transmitted at the RFCOA instance instead of visible light—although an RFCOA can also be combined with an optical COA to make the task of trying to illicitly copy an RFCOA-COA even more burdensome for an adversary. The fingerprint of each RFCOA instance is unique, but may have a different appearance to different types of scanners.

Because an RFCOA scanner typically transmits (as well as receives) RF energy to the RFCOA, the scanner in one sense creates the electromagnetic fingerprint in conjunction with the RFCOA itself. In one implementation, an exemplary scanner has an array of exemplary antennae elements that are miniaturized by folding and meandering the geometry of conventionally larger antenna elements to achieve the same resonance as the conventional larger antenna in a much smaller package. This means that in many hypothetical commercial implementations, a would-be adversary might have to fake not only the RFCOA instance itself—a typically infeasible or impossible feat—but also perhaps fake the antenna elements of the scanner too. Thus, the exemplary RFCOA instances and the exemplary scanners share the property of being very inexpensive to produce but very expensive to attempt to counterfeit.

Other parameters such as impedance response and/or phase information can be used in addition to or instead of the above-mentioned scattering parameters, for constituting an electromagnetic fingerprint response from the RFCOA. Each analog s-parameter is sampled at arbitrary frequencies and individually quantized using an arbitrary quantizer. The electromagnetic fingerprint signal derived from an RFCOA reader may consist of either the "raw" or a compressed version of the RF fingerprint. Compression may be lossy or lossless with respect to the digitized fingerprint extracted from a single RFCOA instance.

Authenticity means that the RFCOA can be read or scanned to determine that it is literally the same object that was original instituted by an authoritative issuer for guaranteeing genuineness. An RFCOA is typically built into or irreversibly affixed to a product or object to be authenticated. "Irreversibly affixed" does not mean that the RFCOA is indestructible, it only means that the RFCOA cannot be removed intact. If the RFCOA is altered or destroyed, it simply ceases to provide an authentication.

When creating an RFCOA instance, the issuer can digitally sign an RFCOA instance's digitized electromagnetic response using traditional public-key cryptography. First, the fingerprint is scanned, digitized, and compressed into a fixed-length bit string f. Next, f is concatenated to the information t associated with the tag (e.g., product ID, expiration date, assigned value) to form a combined bit string message $w=f||t$. One way to sign the resulting message w is to use a Bellare-Rogaway recipe, for signing messages using RSA with message recovery. The resulting signature s as well as w are encoded directly onto the RFCOA instance using existing technologies such as a radio frequency ID (RFID). Each RFCOA instance is associated with an object whose authenticity the issuer wants to vouch for. Once issued, an RFCOA instance can be verified off-line by anyone using a reader that contains the corresponding public key of the issuer. In case the integrity test is successful, the original response fingerprint f and associated data t are extracted from message w. The verifier proceeds to scan in-field the actual RF "fingerprint" f' of the attached instance, i.e., obtain a new reading of the instance's electromagnetic properties, and compare them with f. If the level of similarity between f and f' exceeds a pre-defined and statistically validated threshold δ, the verifier declares the instance to be authentic and displays t. In all other cases, the reader concludes that the instance is not authentic, i.e., it is either counterfeit or erroneously scanned.

To complement the low cost of an RFCOA, the corresponding scanner or reader can also be manufactured as an inexpensive device that verifies the uniqueness of a RFCOA's random structure by detecting the RFCOA's unique electromagnetic fingerprint—caused by the RFCOA's unique random structure. An exemplary low-cost scanner (or "RFCOA reader") has several characteristics that allow miniaturization while safeguarding against attempts to circumvent security.

In one implementation, exemplary RFCOAs complement RFIDs so that the RFID-RFCOA is not only digitally unique and hard to digitally replicate but also physically unique and hard to physically replicate. In one implementation, exemplary RFCOAs constitute a "super-tag" with information about an associated product that can be read from a relatively large far-field distance, but also having authenticity that can be verified at close range, within close proximity or "near-field," with low probability of a false alarm.

In one implementation, an exemplary high-entropy RFCOA is manufactured in such a manner that it is computationally infeasible for an adversary to recreate the RFCOA from scratch with an equivalent electromagnetic fingerprint. The system's achieved entropy—an indicator of the difficulty of reproducing a given RFCOA fingerprint—and other performance features are also analyzed below. The higher the entropy of an RFCOA's unique structure and fingerprint, the lower the likelihood of a false positive authentication, caused either by a purposeful adversary or by chance. The entropy, however, does not specify the difficulty of computing and manufacturing a false positive. The physical phenomena that imply the difficulty of replicating near-exact RFCOAs are discussed below.

Additional information regarding exemplary RFCOAs, their properties and construction, may be found in the above-cited U.S. patent application Ser. No. 11/170,720 to Gerald DeJean and Darko Kirovski, entitled, "Radio Frequency Certificates of Authenticity," filed on Jun. 29, 2005 and incorporated herein by reference.

Exemplary Authentication System

FIG. 1 shows an exemplary authentication system 100 that uses an exemplary RFCOA 102. The exemplary authentication system 100 is meant to provide one example of components and arrangement for the sake of overview. Many other arrangements of the illustrated components, or similar components, are possible. Such an exemplary authentication system 100 can be executed in combinations of hardware, computer executable software, firmware, etc. The components of the exemplary authentication system 100 are introduced next.

The exemplary authentication system 100 includes a radio frequency certificate of authenticity (the RFCOA) 102, e.g., that may be attached as a tag or a seal to a physical object or may be manufactured as part of the object. In one implementation, the RFCOA 102 includes a unique physical structure segment 104 in which an RF interactive agent 105 is immobilized in a 3-dimensional matrix to uniquely reflect, refract, absorb, induct, etc., incoming RF energy creating an electromagnetic fingerprint to be detected by one or more exemplary external readers 106, 108.

In one implementation, the RFCOA 102 includes an RFID system 110 that includes a transponder 112 and an integrated circuit chip 114 for communicating information to a remote scanner 116 via an RFID scanning antenna 118 of the remote far-field RFID scanner 116. The RFID system 110 may include a privacy manager 120 to control the information to be transmitted by the RFID system 110 based on receiving an authorized response—such as a matching fingerprint scan of the RF interactive agent 105, that matches a previously loaded fingerprint response stored on the RFCOA instance 102. The privacy manager 120 may also control information based on the credentials presented by a particular remote (RFID) scanner 116.

A certificate of authenticity (COA) issuer 122 is shown in the exemplary authentication system 100 to initially create and authorize the digital information unique to an RFCOA instance 102. The COA issuer 122 includes the RFCOA reader 106, for detecting the unique pattern of reflected, refracted, absorbed, etc., RF energy—the electromagnetic fingerprint—from the RF interactive agent 105. A digitization module 123 digitizes and compresses (or vice versa) analog signals from the RFCOA reader 106 into a unique structure message referred to herein as fingerprint (f) 124. Fingerprint (f) 124 represents a difficult-to-replicate or infeasible-to-replicate statistic of the unique physical structure segment 104 of the RFCOA 102, as represented by the electromagnetic fingerprint—the RF energy received at antenna elements of the reader (e.g., RFCOA reader 106).

As mentioned above, in one implementation, a textual message (t) 126 may include information 128 about the physical object to which the RFCOA 102 is attached. A concatenator 129 combines the text message (t) 126 with the fingerprint W 124 into a combined message (w) 130.

In one implementation, a hashed and signed version of the combined message (w) 130 is created for later verification of the RFCOA 102. Thus, a hashing module 132 hashes the combined message (w) 130 into a hashed message (h) 134. A signing module 136 signs the hashed message (h) 134 using a key 138 (i.e., the issuer's private key) into a signature message (s) 140. The unhashed and unsigned combined message (w) 130 can be issued to (i.e., stored within) the RFCOA 102 or the RFID system 110 either separately, or in another implementation, concatenated with the hashed and signed signature message (s) 140.

Subsequently, after the product or object has been affixed with its RFCOA instance 102, a separate COA verifier 142 may read the product information stored in the RFCOA 102 from afar, and verifies the authenticity of the RFCOA 102 at close range, i.e., in the near-field of the RFCOA 102—for example, within 1 millimeter from a surface of the RFCOA 102. The COA verifier 142 includes its own reader 108, to read and detect the electromagnetic fingerprint representing the unique physical structure segment 104 of the RFCOA 102 in much the same manner as the RFCOA reader 106 of the COA issuer 122. The digitization module 143 of the COA verifier 142 digitizes and compresses (or vice versa) analog signals from the reader 108 into a test fingerprint (f') 144 for comparison with the fingerprint (f) 124 issued by the COA issuer 122. In one implementation, a decatenator 145 separates the received combined message (w) 130 back into the text message (t) 126 and the digitized fingerprint (f) 124. The text message (t) 126 can be shown on a display 146. In one implementation, a security module 148 uses a key 150 (such as a public key of the issuer's encryption key pair that includes the issuer's private key 138) to verify the signature message(s) 140 against the hash of the combined message (w) 130. If the verification is successful, the associated textual information 128 is shown on the display 146.

The fingerprint (f) 124 from the combined message (w) 130 is passed to a comparator 152 for comparison with the test fingerprint (f') 144 scanned by the COA verifier 142. If the fingerprint (f) 124 and the test fingerprint (f') 144 have a similarity that surpasses a selected threshold, then a readout 154 indicates that the information 128 in the text message (t) 126 is authentic. This also means that the RFCOA 102 is authentically the same RFCOA 102 that the issuer attached to physical object. Alternatively, this also means that if the RFCOA 102 is serving as a product seal, the seal is unbroken.

Exemplary Radio Frequency COAs (RFCOAs) and Scanners in Greater Detail

Exemplary RFCOAs 102 are built based upon several near-field phenomena that electromagnetic waves exhibit when interacting with complex, random, and dense objects. Electromagnetic fingerprints based on these phenomena make RFCOAs 102 good counterfeit deterrents. For example, arbitrary dielectric or conductive objects with topologies comparable or proportional in size to a RF wave's wavelength behave as electromagnetic scatterers, i.e., they reradiate electromagnetic energy into free space. Further, the refraction and reflection of electromagnetic waves at the boundary of two media can produce hard-to-predict near-field effects; e.g., the phenomenon can be modeled based upon the generalized Ewald-Oseen extinction theorem.

In general, an object created as a random constellation of small (but still with diameters greater than 1 mm) randomly-shaped conductive and/or dielectric pieces has distinct behavior in its near-field when exposed to electromagnetic waves coming from a specific point and with frequencies across parts of the RF spectrum (e.g., 1 GHz up to 300 GHz).

In one implementation, the exemplary RFCOA reader 106 reliably extracts an electromagnetic RF fingerprint from an RFCOA instance 102 in a high, but still inexpensive range of frequencies (e.g., 5-6 GHz). For example, in order to disturb the near-field of the RFCOA 102 with RF energy, the RFCOA 102 can be built as a collection of randomly bent, thin conductive wires with lengths randomly selected within the range of 3-7 cm. The wires may be integrated into a single object using a transparent dielectric sealant.

The sealant fixes the wires' positions within the single object permanently. The electromagnetic fingerprint of such an RFCOA instance 102 represents the three-dimensional structure of the object as an analogous unique electromagnetic response. In order to obtain the electromagnetic fingerprint, an exemplary RFCOA reader 106 is built as an array (or matrix) of individually excited antenna elements with an analog/digital back-end. In one implementation, each antenna element can behave as a transmitter or receiver of RF waves in a specific frequency band supported by the back-end processing. For different constellations of dielectric or conductive objects between a particular transmitter-receiver coupling of different antenna elements, the scattering parameters for this coupling are expected to be distinct. Hence, in order to compute the RF fingerprint, the RFCOA reader 106 collects the scattering parameters for each transmitter-receiver coupling in the array of individually excited antenna elements.

It is worth noting that measurements from the RFCOA reader 106 represent electromagnetic effects that occur in the near-field of the RFCOA reader 106 (transmitter and receiver) and RFCOA 102. The exemplary RFCOA reader 106 is designed to obtain electromagnetic effects in the near-field in this manner for several reasons:

- It is difficult to maliciously jam near-field communication;
- The RFCOA reader 106 can operate with low-power, low-efficiency antenna designs;
- The variance of the electromagnetic field is relatively high in the near-field, causing better distinguishing characteristics in an electromagnetic fingerprint. Far-field responses, on the other hand, just represent average characteristics of random discrete scatterers, thus, they lose the ability to represent the scatterer's random structure;
- Computing the actual physical metrics numerically is a difficult task. In general, while all electromagnetic phenomena are analytically explained using the Maxwell equations, even fundamental problems such as computing responses from simple antennae with regular geometries, are notoriously intensive computational tasks with arguable accuracy.

Figure 2:
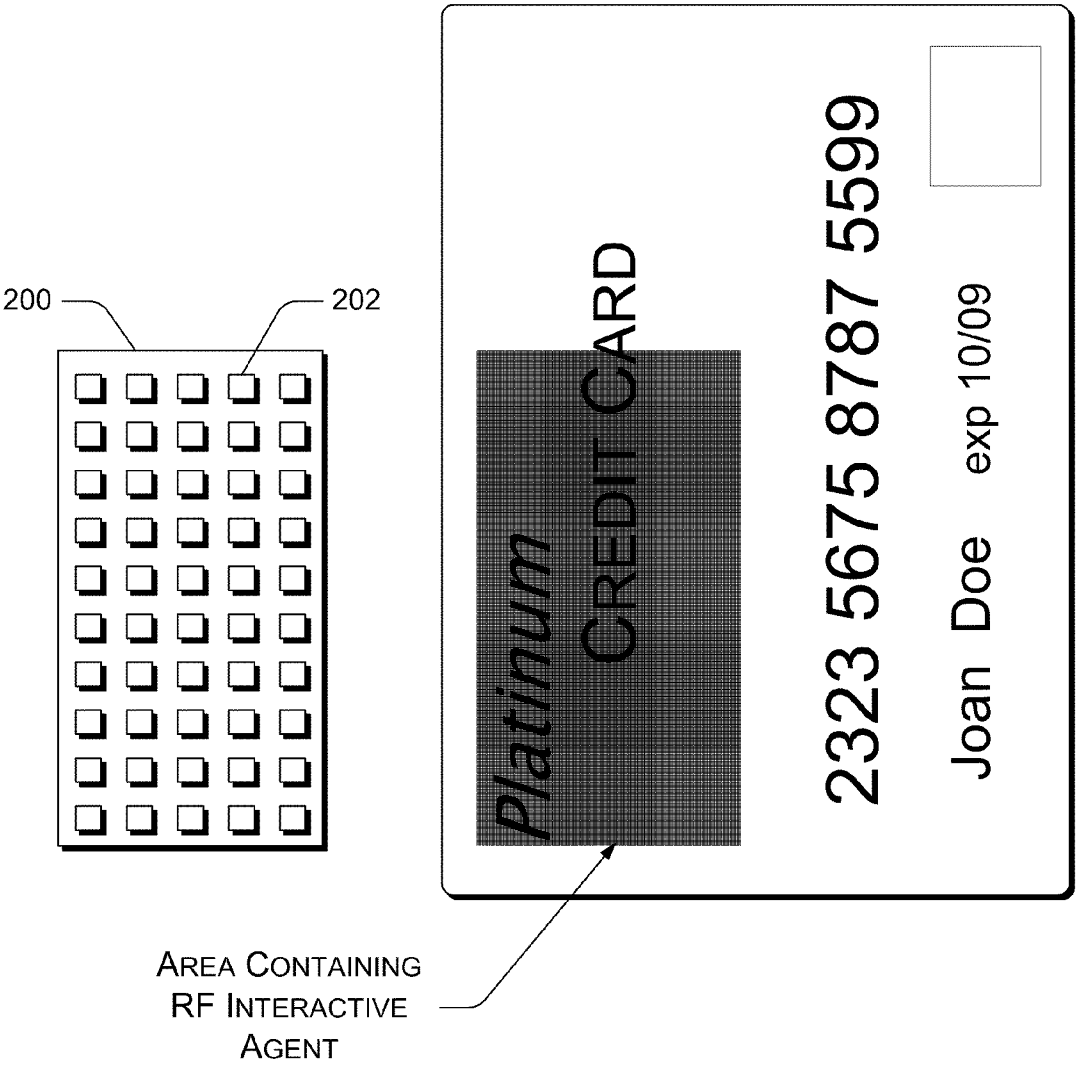
FIG. 2 is a diagram of an exemplary array of antenna elements for reading an RFCOA.

FIG. 2 shows one implementation of an exemplary antenna array 200 of the exemplary RFCOA reader 106. The exemplary array has a matrix of 5×10 antenna elements (e.g., element 202) that measure the unique electromagnetic fingerprint response of an RFCOA 102 as a collection of transmission (e.g., $s_{1,2}$-parameter) responses in the 5-6 GHz frequency range for each transmitter/receiver coupling of antenna elements 202 in the antenna array 200. RFCOA instances 102 were placed at approximately 0.5 millimeter from the physical matrix of the antenna array 200, i.e., in the near-field of the RFCOA reader 106. In one implementation, the analog/digital back-end can include an off-the-shelf network analyzer. A custom model of RFCOA reader 106 may cost less than US $100 if manufactured en masse.

Exemplary RFCOA-Bearing Credit Card

One of the features of RFCOAs 102 is that their electromagnetic fingerprints do not reveal their physical structure in a straightforward manner. In one scenario, credit cards can be protected using RFCOAs 102. Even though an adversary accesses full credit card information from a merchant database (e.g., the cardholder's name, card number and expiration date, the PIN code, and even the RFCOA's fingerprint), it is still difficult or infeasible for the adversary to create a physical copy of the original credit card produced by the issuing bank. To complete such a counterfeiting operation, the adversary would have to gain physical access to the original credit card and accurately scan its 3D structure (e.g., using X-rays or other 3D imaging systems). Finally, the adversary would still face the task of actually physically building the 3D copy of the RFCOA 102, a task that requires significant cost.

Other Applications of RFCOAs

Besides credit cards, currency, checks, and money orders can be signed by the issuing bank via an included RFCOA 102. In addition, some of these documents can be signed by other parties signifying ownership, timestamp, and/or endorsement. Banks, account holders, and document recipients can all verify that the document has been issued by a specific bank. This exemplary framework can enable all features needed to transfer, share, merge, expire, or vouch checks. An additional feature is that information about the document does not reveal its physical structure in a straightforward fashion.

License and product tags, warranties, and receipts already use existing COAs based on sophisticated printing technologies, but these suffer from relative ease of replication and/or license alteration. An exemplary RFCOA system 100 aims at remedying this deficiency, and also enables several other features such as proof of purchase/return, proof of repair, transferable warranty, etc. Note that the RFCOA 102 must be firmly attached to the associated object as an adversary may attempt to remove, substitute, or attach valid RFCOAs at will. Some of these problems can be rectified by devaluing or decrementing RFCOAs at point of sales or by recording transactions on the RFCOA itself For example, a license tag may consist of two independently identifiable RFCOA instances, where one is deleted at purchase time to signal a sold product. The same procedure can be used to signal and/or value a product's "nth owner."

Besides providing a relatively secure way of issuing and verifying coupons and tickets, the exemplary RFCOA framework 100 enables all parties involved to reliably participate in complex business models such as third-party conditional discounts and coupon/ticket sharing and transfer.

Regarding hard-to-copy documents such as identity cards, visas, passports, RFCOAs 102 can make personal identity cards (both paper and smart card-based) difficult to copy. In addition, RFCOAs 102 can protect and/or associate additional information to signed paper documents or artwork. The technology can be used preventively against identity theft, so that illegally obtained identity information cannot be used to materialize a valid identity card unless the original is physically accessible.

For seals and tamper-evident hardware, RFCOAs can be used to create casings for processors or smart-cards that can provide strong evidence of whether the chip has been tampered with. Similarly, RFCOAs can be used to seal medication packages so that opening a package destroys the RFCOA's physical structure beyond possible restoration. In one implementation, an object with a first RFCOA 102 can be sealed with packaging that contains a second RFCOA 102'. An RFCOA reader 106 can still communicate with the first RFCOA 106 (although sealed) and have an additional write-once opportunity that may include the electromagnetic fingerprint response of the second RFCOA 102'.

RFCOA Protection of Valued Objects

In order to counterfeit protected objects, an adversary needs to perform one of the following:

- The adversary can compute the private key of the issuer—a task that can be made arbitrarily difficult by adjusting the key length of the public-key cryptosystem employed;
- The adversary can also devise a manufacturing process that can exactly replicate an already signed RFCOA instance 102—a task that is not infeasible, but requires a certain expense by the malicious party—the cost of forgery dictates the value that a single RFCOA instance 102 can protect;
- The adversary can also misappropriate a signed RFCOA instance 102—a preventative responsibility of the organization that issues the RFCOA 102.

Given the above "adversary tasks," an RFCOA 102 can be used to protect objects whose value roughly does not exceed the cost of forging a single RFCOA instance 102 including the accumulated successful development of an adversarial manufacturing process described above.

Exemplary RFCOA instances 102 require a true three dimensional (3D) volumetric manufacturing ability by the counterfeiter, i.e., the ability to create arbitrary 3D structures and embed them in a soft or hard encapsulating sealant. The structures could be made from homogeneous liquids in certain scenarios. In both cases, the cost of near-exact replication of such RFCOA instances 102 is greatly increased. Second, since a readout of the electromagnetic fingerprint representing their random structure does not require reader-object physical contact, RFCOAs 102 may be built with superior wear and tear properties.

For a credit card-sized RFCOA instance 102 and a reader 106 that operates in the 5-6 GHz frequency sub-band, the entropy of the readout response from exemplary RFCOAs 102 exceeds several thousand bits, making the likelihood of accidental collusion negligible.

As described above with respect to credit cards, exemplary RFCOAs 102 have another important qualitative feature not exhibited by other types of COAs. For a given electromagnetic fingerprint f, it is difficult to numerically design a 3D topology of a counterfeit instance that would produce f accurately. Thus, when credit cards are protected by RFCOAs 102, even when an adversary has full credit card information (e.g., holder's name, card's number and expiration date, PIN code, and even the RFCOA 102 fingerprint), it would still be still difficult for the adversary to create a physical copy of the original credit card produced by the issuing bank even if the counterfeiter owned a 3D volumetric manufacturing system.

Next, related theoretical work in electromagnetics is presented, geared towards system variables measured by an RFCOA reader 106 and field solvers for reading the electromagnetic fingerprint via an array of RF antenna elements. The achieved "verifiable" entropy of proposed RFCOA instances 102 is presented for an exemplary RFCOA reader 106.

Physical Phenomena Relevant to RFCOA Electromagnetic Fingerprints

Exemplary RFCOAs readers 106 use near-field measurements of electromagnetic properties exhibited by an RFCOA instance 102. The following describes the difficulty of computing numerically the electromagnetic properties of a system consisting of an RFCOA reader 106 and an RFCOA instance 102, in a spatial orientation with respect to each other.

Electromagnetic fields are characterized by their electric vector E and magnetic vector H. In material media, the response to the excitation produced by these fields is described by the electric displacement D and the magnetic induction B. The interaction between these variables is described using Maxwell's equations, as shown in Equation set (1):

$$\nabla \times H = \frac{1}{c}\frac{\partial D}{\partial t} + \frac{4\pi}{c} j \quad (1)$$
$$\nabla \times E + \frac{1}{c}\frac{\partial B}{\partial t} = 0$$
$$\nabla \cdot D = 4\pi\rho$$
$$\nabla \cdot B = 0,$$

where c is speed of light in vacuum, and j and ρ denote electric current density and charge density, respectively. For most media, there are linear relationships:

$$D=E+4\pi P=\in E, B=H+4\pi M=\mu H, j=\sigma E, \quad (2)$$

where ∈, μ, and σ are dielectric permittivity, magnetic susceptibility, and a material's specific conductivity, respectively, and P and M are the polarization and magnetization vectors respectively. From the curls in Equations (1) and (2), the subsequent equations that model propagation of a monochromatic (time-dependency factor exp(i ω t)) electromagnetic wave can be derived, as in Equations (3) and (4):

$$F_e = \nabla \times \nabla \times E - k^2 E = -4\pi\left[\frac{ik}{c} j + k^2 P + ik\nabla \times M\right] \quad (3)$$

$$F_m = \nabla \times \nabla \times H - k^2 H = 4\pi\left[\frac{1}{c}\nabla \times j - ik\nabla \times P + k^2 M\right], \quad (4)$$

where $$k = \frac{\omega}{c}$$

is the wavenumber. Equations. (3) and (4) fully describe electromagnetic waves in 3D space. Another form, however, is commonly used for simulation of scattering based upon the Ewald-Oseen extinction theorem, derived later from the Maxwell equations.

Figure 3:
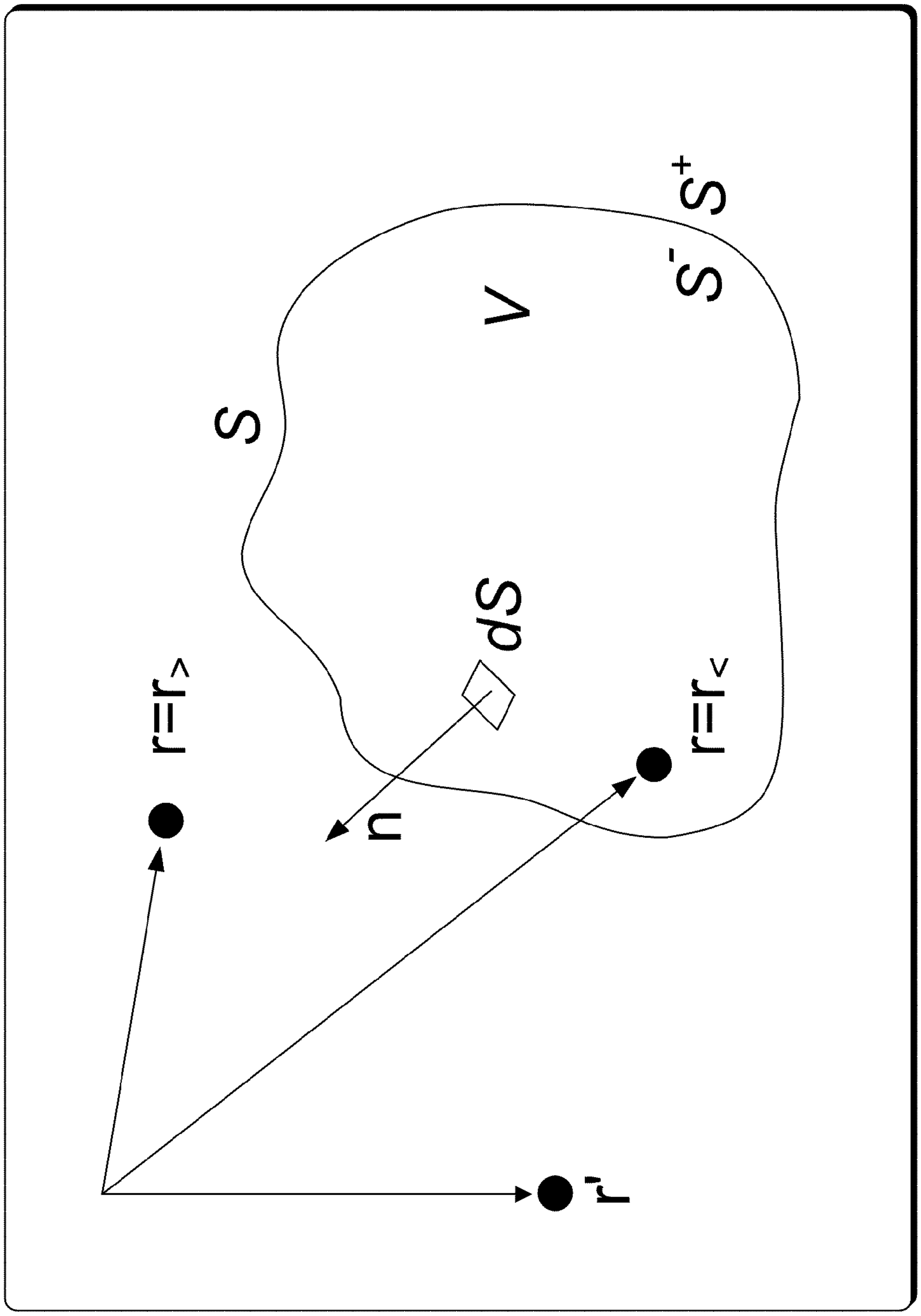
FIG. 3 is a diagram of electromagnetic variables operative in an RFCOA scanner.

To describe these concepts, consider a material medium occupying a volume V limited by a surface S. The terms $r_>$ and $r_<$ are used to denote vectors to an arbitrary point outside and inside V, respectively. The variables are illustrated in FIG. 3. The dyadic form $\mathbb{G}$ (r, r') of the scalar Green function G(r, r') describes a spherical wave at point r sourced from point r', as in Equations (5) and (6):

$$\mathbb{G}(r, r') = \left(\mathcal{G} + \frac{1}{k^2}\nabla\nabla\right)G(r, r'), \quad (5)$$

$$G(r, r') = \frac{\exp(ik|r - r'|)}{|r - r'|} \quad (6)$$

where $\mathcal{G}$ is a unit dyadic. Now, the generalized extinction theorem states, as represented in Equations (7)-(10):

$$E(r_<) = \frac{1}{4\pi}\int_v F_e(r')\cdot\mathbb{G}(r_<, r')d^3r' - \frac{1}{4\pi}\sum_e^{(-)}(r_<) \quad (7)$$

$$E^{(i)}(r_<) + \frac{1}{4\pi}S_e(r_<) = 0 \quad (8)$$

$$E(r_>) = E^{(i)}(r_>) + \frac{1}{4\pi}S_e(r_>) \quad (9)$$

$$0 = \frac{1}{4\pi}\int_v F_e(r')\cdot\mathcal{G}(r_>, r')d^3r' - \frac{1}{4\pi}\sum_e^{(-)}(r_>), \quad (10)$$

where points r and r' are both inside V (Equation 7), inside and outside of V (Equation 8), both are outside of V (Equation 9), and outside and inside V (Equation 10). $E^{(i)}$ is the incident field upon V, and as shown in Equations (11) and (12):

$$S_e = \int_{S^-} \left[ \left( n \times (\nabla \times E - 4\pi i k M) + \frac{4\pi i k}{c} j \right) \cdot \mathbb{G}(r, r') + (n \times E) \cdot \nabla \times \mathbb{G}(r, r') \right] dS, \tag{11}$$

$$\sum_e^{(-)} = \int_{S^-} [(n \times \nabla \times E) \cdot \mathbb{G}(r, r') + (n \times E) \cdot \nabla \times \mathbb{G}(r, r')] dS, \tag{12}$$

where $S^-$ signifies integration approaching the surface S from the inside of V and n is a unit vector outward normal to dS. An analogous set of equations can be derived for the magnetic field. In the context of RFCOAs 102, of particular importance are Equations (8) and (9) and their magnetic analogues as they govern the behavior of the electromagnetic field inside and outside of V when the source is outside of V. They can be restated in different famous forms that can be adjusted for alternative material conditions (non-magnetic, non-conductor, linear, isotropic, spatially dispersive, etc.).

Providing numerical solutions to the above Equations is not a simple task, especially when field values are computed in the near-field of the RF interactive agent 105. In fact most related research in similar fields targets radar, communication, and geodesic applications; and hence they focus upon approximating rough surfaces with a Gaussian distribution and computing the first and second order statistics of the exerted electromagnetic far-field. To adequately describe an arbitrary field setup, one of the classical electromagnetic field equation solvers is often needed, that addresses the above Equations (8) and (9).

There are numerous methodologies used for finding approximate solution of partial differential equations as well as of integral equations: Finite-Difference Time-Domain (FDTD), Finite Element Method (FEM), and Method of Moments (MOM). Commercial simulators typically offer several solvers as they usually offer distinct advantages for certain problem specifications. In general, the computational complexity of most techniques is linked to their accuracy; accurate methodologies are typically superlinear: O (N logN) for improved MOM and FEM and $O(N^{1.33})$ for FDTD, where N equals the number of discrete elements (typically, simple polygon surfaces) used to model the simulated electromagnetic environment. For an exemplary RFCOA system 100, for a known RFCOA topology, accurate simulations may require in excess of $N>10^8$ discrete elements. An example of the substantial discrepancy in accuracy and performance of modern field solvers can be observed in a recent comparison study of six state-of-the-art solvers. For a relatively simple semi-2D structure, a Vivaldi antenna with an operating frequency of 4.5 GHz, modeled with approximately $N \sim 10^5$ discrete elements, individual simulation results for the $s_{1,2}$-parameter (RF scattering parameter) in the 3-7 GHz band differed up to 12 dB, with additional substantial differences with respect to actual measurements of the physical implementation of the structure. The fastest program in the suite returned accurate results after approximately one hour processing on a 800 MHz Pentium processor. In summary, after several decades of research in this important field, state-of-the-art tools are far from fast and far from accurate.

Exemplary RFCOAs 102 are relatively small but exhibit distinct and strong variance of transmission parameters when placed between a transmitter/receiver antennae coupling, i.e., between transmitting and receiving antenna elements 202 of the exemplary antenna array 200. In one implementation, an RFCOA reader 106 uses the theory of resonators; however other phenomena could significantly and profoundly affect transmission of RF energy, such as randomly shaped and positioned metamaterials (materials that exhibit a negative index of refraction) or discrete dielectric scatterers. Ultimately, by combining scatterers with different properties, it is more difficult to find accurate approximations that can accelerate a field solver.

Quantifying Electromagnetic Effects from an RFCOA

When an RF wave impinges upon an RFCOA instance 102, its percentage of reflection and refraction are dependant on positioning of the scatterers, which creates a distinct RF response, particularly in the near-field. One or more exemplary arrays of antenna elements 202 can be both the source of the RF waves and simultaneously the reader of the RF response after the RF waves impinge the RFCOA 102. Each antenna element 202 in the array 200 can transmit an RF wave as well as receive an RF response signal to establish an RF image of the object. For example, by taking two antennae and placing them in close proximity to each other with the scatterers of the RF interactive agent 105 in between, many frequency dependent data sets can be collected and measured on a network analyzer, such as the scattering parameters (s-parameters), phase information, and impedance data. In many implementations, exemplary RFCOA readers 106 try to quantify the scattering parameters in order to obtain the electromagnetic fingerprint of the RFCOA instance 102. Thus, Equation (13) shows the total voltage $V_n$ of a device or port which is the sum of the voltage input into a device $V_n^+$ and the voltage received from the device $V_n^-$:

$$V_n = V_n^+ + V_n^-. \tag{13}$$

In a simple example, for two antennae under test, four specific s-parameters can be obtained for the two-port network. A matrix representation of the relationship between the voltage and the s-parameters is shown in Equation. (14):

$$\begin{bmatrix} V_1 - \\ V_2 - \end{bmatrix} = \begin{bmatrix} s_{1,1} & s_{1,2} \\ s_{2,1} & s_{2,2} \end{bmatrix} \begin{bmatrix} V_1 + \\ V_2 + \end{bmatrix} \tag{14}$$

For example, if the s-parameters of two antennae are obtained, the possible parameters collected are $s_{1,1}$, $s_{1,2}$, $s_{2,1}$, and $s_{2,2}$. These s-parameters represent a ratio of the voltage signal received to the voltage signal input from the antenna element 202. Therefore, for example, $s_{1,2}$ measures the voltage signal received from antenna 1 to the voltage signal input from antenna 2. More formally, as in Equations (15):

$$s_{1,1} = \left.\frac{V_1^-}{V_1^+}\right|_{V_2^+=0} \qquad s_{1,2} = \left.\frac{V_1^-}{V_2^+}\right|_{V_1^+=0} \qquad s_{2,1} = \left.\frac{V_2^-}{V_1^+}\right|_{V_2^+=0} \qquad s_{2,2} = \left.\frac{V_2^-}{V_2^+}\right|_{V_2^+=0} \tag{15}$$

This approach can be applied only to near-field reception of signals. In the far-field, the transmission and reception of the antenna's signal can be obstructed by buildings, atmospheric conditions, and multipath signals from other data transmission devices such as cellular phones. In addition, an adversary can jam the communication producing arbitrary electromagnetic effects that can affect the security of the system.

Exemplary RFCOA Scanner

In order to scan the electromagnetic features of RFCOA instance 102, an exemplary scanner (RFCOA reader 106) is designed to expose the subtle variances of the above-described near-field electromagnetic effects resulting from impingement of RF energy on an RFCOA instance 102. In one implementation, the RFCOA reader 106 consists of one or more arrays of antennae elements, such as that shown in FIG. 2, each of the arrays 200 capable of operating both as a transmitter and a receiver of RF waves. The number of antenna elements 202 in each array 200 can be varied according to application, for example, a nine element array or a fifty element array can be used depending on circumstances. In one implementation, each antenna element 202 is multiplexed to an analog/digital backend capable of extracting, e.g., the $s_{2,1}$-parameter (i.e., transmission loss) for a particular antennae coupling between transmitting and receiving antenna elements 202.

Figure 4:
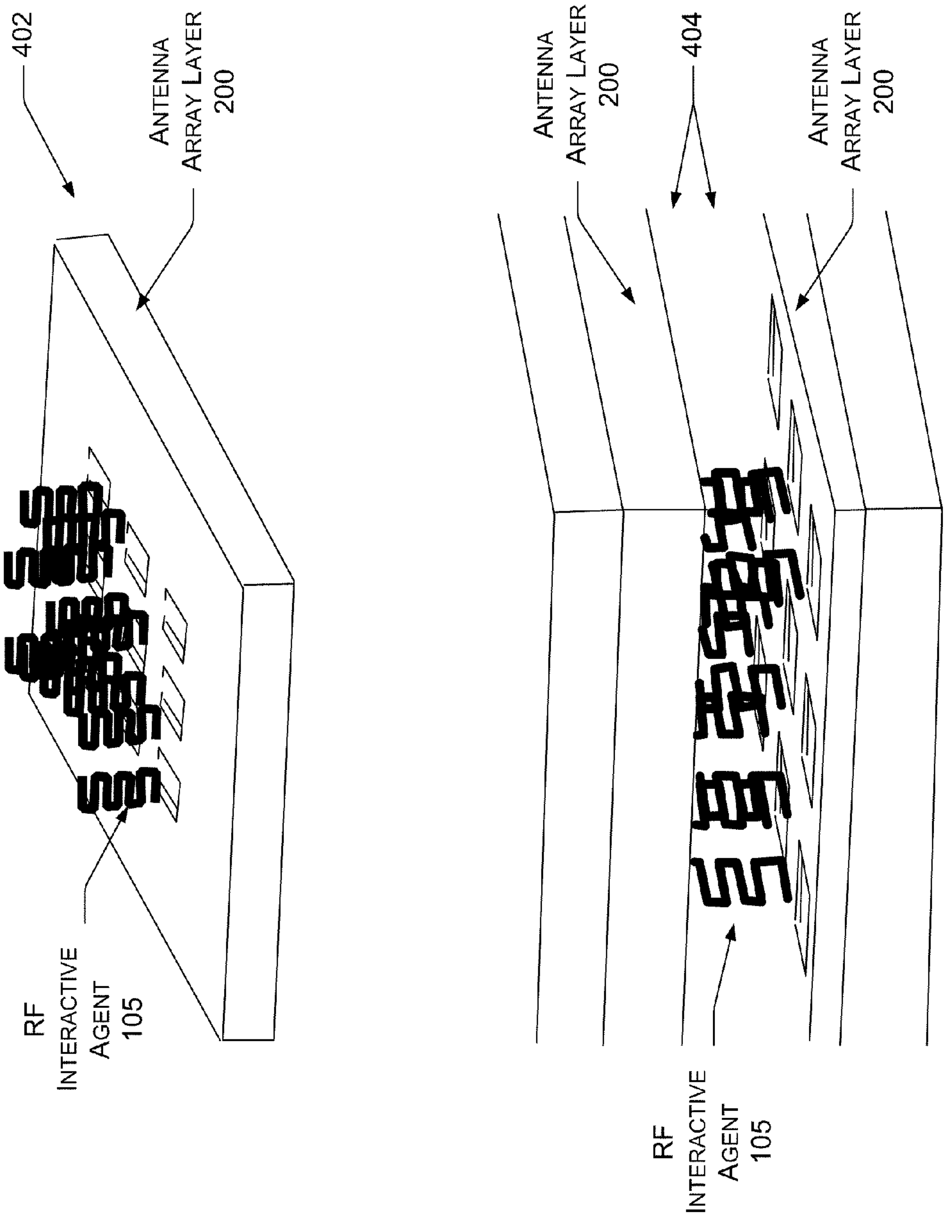
FIG. 4 is a diagram of two exemplary types of RFCOA scanners.

As shown in FIG. 4, there are numerous variations of how antenna elements 202 can be oriented in space. For example, "stamp" 402 and "sandwich" 404 style scanners illustrated in FIG. 5. In the former stamp style 402, a single antenna matrix 200 is placed near the RFCOA instance 102, which has an absorbent and/or reflective background so that the environment behind the tag does not affect its RF response. In the latter sandwich style 404, two planar antenna arrays 200 are placed at near distance to the RF interactive agent 105 of the RFCOA 102, in parallel planes, and the RFCOA instance 102 with its RF interactive agent 105 is inserted in between for the near-field measurements. For clarity, brevity, and simplicity, the stamp style 402 of scanner will be described below, although the sandwich style 404 may provide features of convenient readout for many applications as well as may exhibit improved system entropy—making counterfeiting difficult.

The remainder of this description emphasizes the stamp style 402 as an example when referring to the terms scanner or RFCOA reader 106.

By placing the RFCOA 102 in close proximity to the antenna array 200 as illustrated in FIG. 4, numerous measurements can be collected, including all s-parameters. For example, for a system with M antennae, the exemplary RFCOA reader 106 can measure M $s_{1,1}$ parameters and $$\binom{M}{2} s_{2,1}$$

parameters. Depending upon the accuracy of the analog and digital circuitry as well as the noise due to external factors, one can aim to maximize the entropy of this response. Entropy in this sense provides an indicator of the difficulty of reproducing a given RFCOA electromagnetic fingerprint.

Individual Antenna Element Designs

Figure 5:
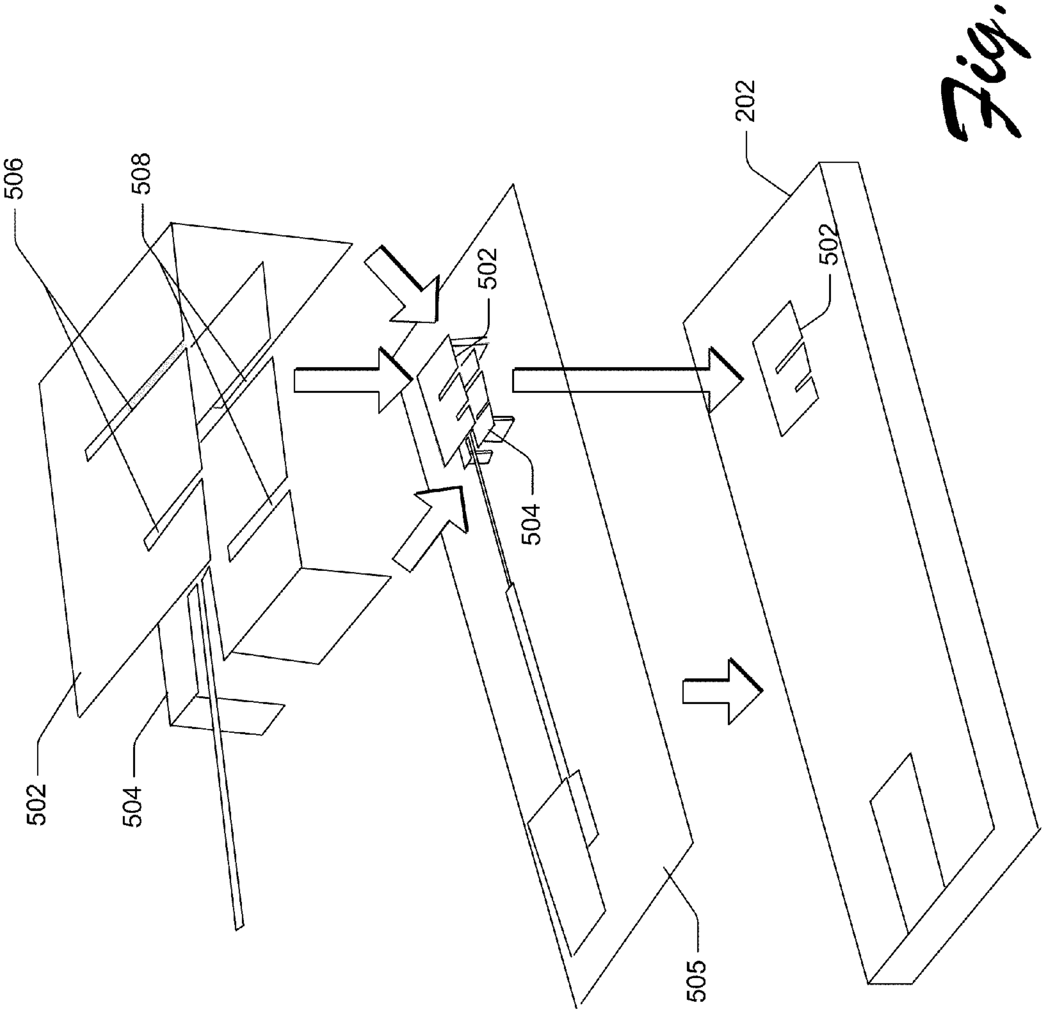
FIG. 5 is a diagram of an elevation view of an exemplary antenna element for reading an RFCOA.

The RFCOA readers 106 have exemplary antenna elements 202 positioned in exemplary arrays 200 (FIG. 2). In one implementation, as shown in FIG. 5, each antenna element 202 has individual microstrip antenna patches (e.g., 502 and 504) that have an operating frequency close to the 5 GHz range and that are optimized for miniaturization. In order to pack as many antennae elements 202 as possible in a small area, such as the area of one side of a credit card, exemplary antenna patches 502 and 504 (such as the microstrip type) in each antenna element 202 may be created through a combination of two minimization techniques: folding and meandering. The two techniques are used together to create an antenna element 202 that is smaller than if only one of the techniques was used.

The theory behind the folding technique is now explained. First, an approximately $\lambda_0/2$ resonant length patch antenna ("$\lambda_0$" denotes wavelength) is transformed to have a resonant length of $\lambda_0/8$. That is, a conventional rectangular patch antenna operating at the fundamental mode (e.g., $TM_{010}$ mode) has an electrical length of $\lambda_0/2$ of the RF energy wavelength. Considering that the electric field is zero for the mode at the middle of the patch, the patch can be shorted along its middle line with a metal wall without significantly changing the resonant frequency of the antenna. This addition shortens the physical length of the antenna to approximately $\lambda_0/4$. Next, the side of the antenna opposite the shorting wall can be folded along the middle of the patch. Simultaneously, the ground plane 505 of such a patch antenna element 202 can also be folded along a position that is a short distance from the middle of the patch. Folding the shorted patch together with the ground plane maintains the total resonant length of the antenna at $\lambda_0/4$, while the physical length of the antenna gets reduced to $\lambda_0/8$ via the folding operation. Folding the ground plane as well as the shorted patch allows this reduction in size.

In one implementation, the second miniaturization technique—meandering—is realized by trimming slits (e.g., slits sets 506 and 508) in the non-radiating edges of the antenna structure (such as the edges of antenna patches 502 and 504). Theoretically if a first patch antenna and a second patch antenna have the same length (from one end to another) and the first patch has no perturbations (or discontinuities) in its geometry, but the second patch has trimmed slits in its non-radiating edge, then the "current path" in the second patch is longer, and hence, it will resonate at a lower frequency than the first patch. It is often mistaken that only the physical length of an antenna determines the frequency at which the antenna will radiate. But in the case of patches with trimmed slits, the resonant length is longer due to the slits in the design. To operate the second patch at the same frequency as the first patch, the physical length of the second patch can be made smaller. The exemplary antenna element 202 includes this meandering design to further reduce the total size of the micropatch structures 502 and 504 over the technique of folding alone.

Figure 6:
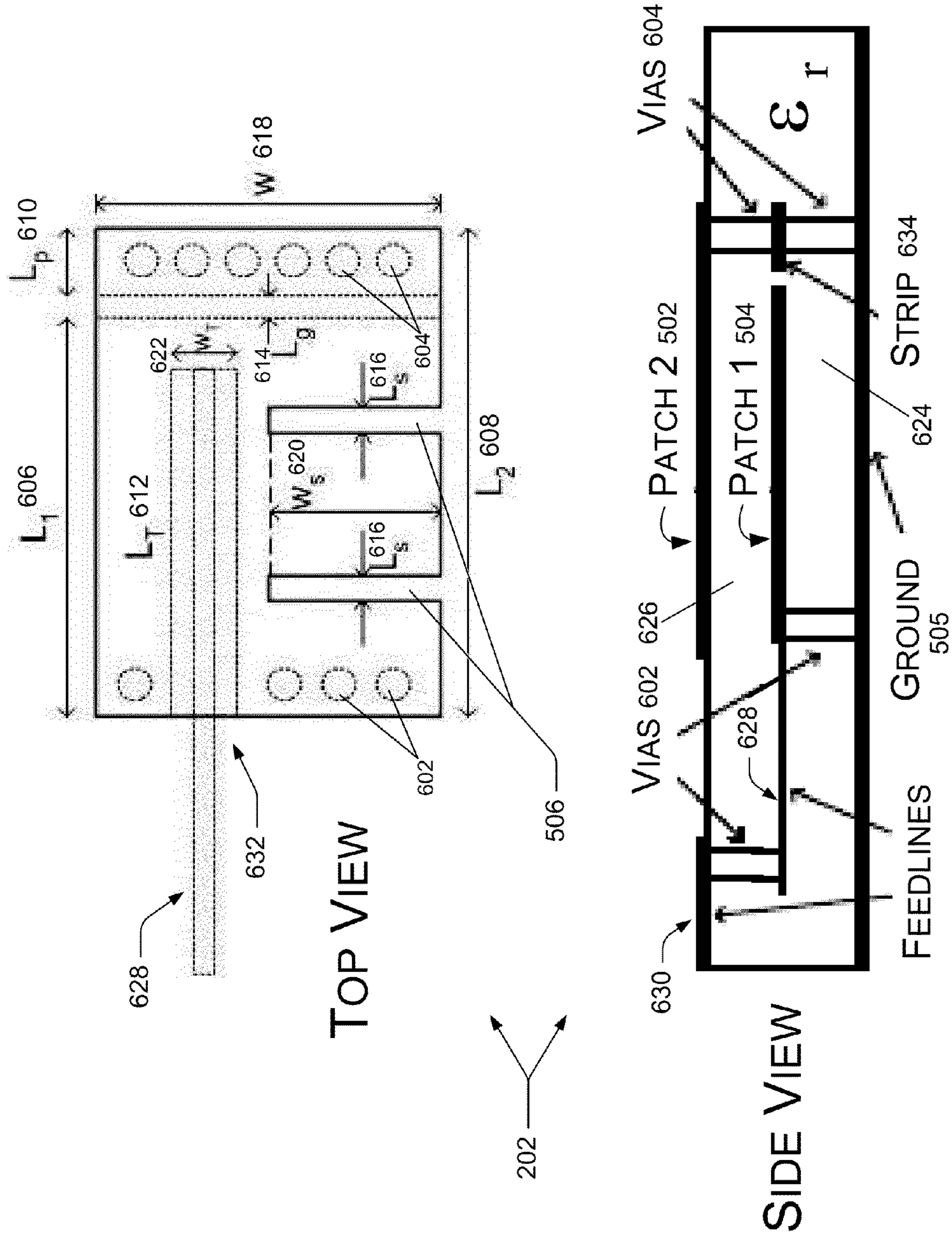
FIG. 6 is a diagram of top and side views of the exemplary antenna element of FIG. 5.

In one implementation, the geometry of a single exemplary antenna element 202, (such as that of FIG. 5), is shown in further detail in FIG. 6. The exemplary antenna element 202 includes three metallic layers (a bottom layer, an intermediate layer, and a top layer) and two substrate layers between the metallic layers. In this implementation, the ground plane 505 of the antenna element 202 is placed on the bottom metal layer. A first patch element 504 is placed on the intermediate layer and a second patch element 502 is placed on the top layer. The resonant length of the first patch 504 (on the intermediate layer) is slightly smaller than the resonant length of the second patch 502 (on the top layer). Each patch is shorted to the ground plane 505 with vias (e.g., 602 and 604), but on opposite sides (opposite radiating edges) of each other.

In this implementation, the dimensions of the antenna element components are as follows (where 39.37 mils=1 millimeter): "$L_1$" 606 equals 109 mils, "$L_2$" 608 equals 131 mils, "$L_p$" 610 equals 16 mils, "$L_T$" 612 equals 96 mils, "$L_g$" 614 equals 6 mils, "$L_s$" 616 equals 6 mils, "W" 618 equals 109 mils, "$W_s$" 620 equals 50.5 mils, and "$W_T$" 622 equals 20 mils. In this implementation, the substrate for the design is RF60, by Taconic, Ltd., which has a dielectric constant $\epsilon_r$=6.15 and a loss tangent tan $\delta$=0.0028 (Taconic International Ltd., St. Petersburgh, N.Y.). The first substrate layer 624 is placed between the ground plane 505 and the first patch 504, while the second substrate layer 626 is placed between the first patch 504 and the second patch 502. In this implementation, each substrate slayer is 31 mils thick.

The first patch 504 is fed by a first microstrip line 628 that is placed on the intermediate layer. A second microstrip line 630 is placed on the top layer and connected to the microstrip line on the intermediate layer by a via 602. The width of the inset may be uncharacteristically long to achieve a good impedance match. High impedance lines that have a smaller width can sometimes not be utilized based on fabrication restrictions for the minimum trace of the lines. The width of the microstrip lines 628 and 630 is 6 mils, which in some scenarios is the smallest trace that can be fabricated in such an implementation.

Slits (e.g., 506) have been placed in patches 502 and 504 for the purpose of lengthening the current path. This obtains shorter element length and smaller area at a fixed frequency around 5 GHz. The row of vias 604 that create a short circuit between the first patch 504 and the ground plane 505 are trivially displayed in FIG. 6. There is also a large gap 632 between the vias where the first patch 504 exits. The diameter of each via is 8 mils and the center-to-center spacing between vias is 16 mils. The second row of vias 604 that connects the second patch 502 to the ground plane 505 also has center-to-center spacing of 16 mils between vias 604. In this second row 604, there is no direct via connection from the ground plane 505 to the second patch 502. Instead, a row of vias is placed between the top layer and a metallic strip 634 on the intermediate layer. Then, the metallic strip 634 is connected to the ground plane 505 through another row of vias.

Figure 7:
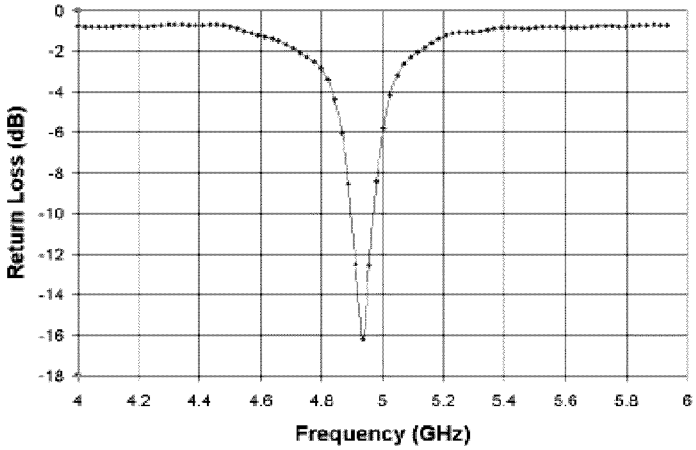
FIG. 7 is a diagram of exemplary simulated return loss and radiation patterns associated with reading an RFCOA.
Figure 7:
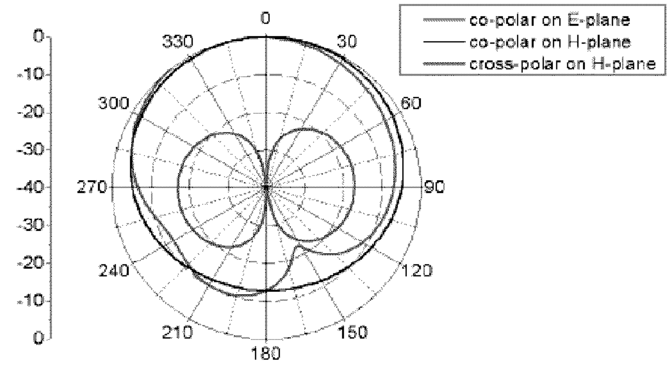

The single antenna element 202 of FIG. 6 was simulated using Microstripes 6.5, a 3D full wave simulator that solves for the E- and H-fields via the transmission line matrix (TLM) method. FIG. 7 shows the simulated return loss and radiation patterns 704. The major criterion in the return loss plot 702 is the resonance of the antenna element 202 at a frequency around 5 GHz. In simulation, the return loss is −16 dB at a resonant frequency of 4.933 GHz. This plot 702 confirms through simulation that the method of miniaturization is valid. The physical size of a patch antenna that operates around the same frequency for a similar size substrate (RF60) is somewhat smaller than the design considered in this paper. The illustrated radiation patterns 704 are the E- and H-plane co-polarized and cross-polarized radiation patterns 704. A beam tilt of 17° is observed in the E-plane co-polarized component due to the contribution of radiation in the feeding structure.

Exemplary Arrays of the Antenna Elements

Figure 8:
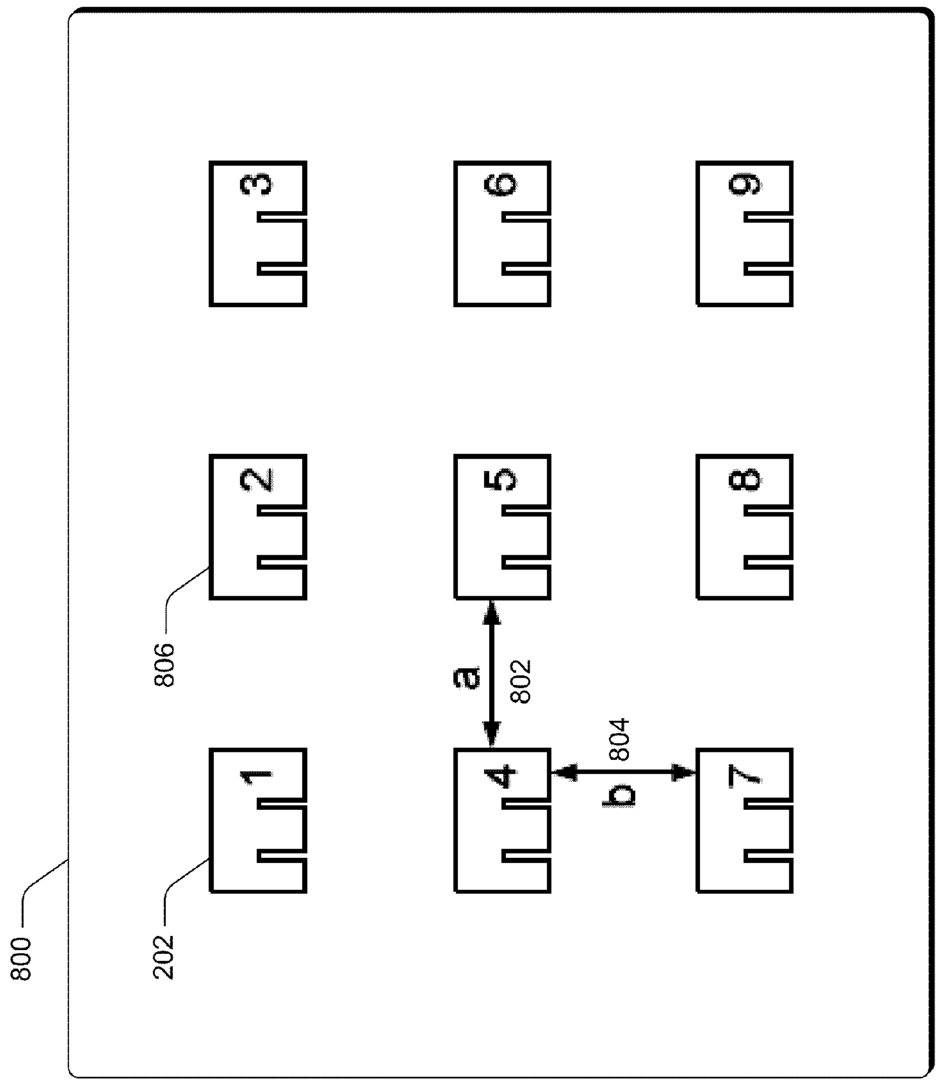
FIG. 8 is a diagram of an exemplary array of antenna elements for reading an RFCOA.

Various exemplary arrays of the antenna elements can be suited to a particular size and style of RFCOA 102. In one implementation, an exemplary array has nine antennae in three rows and three columns. FIG. 8 shows the array 800 with individual antenna elements 202, designated by numbers 1-9. The separation distances between the antenna elements 202 are denoted as "a" 802 equals 131 mils and "b" 804 equals 153 mils. The dimensions of the individual antenna elements 202 are the same as those shown in FIGS. 5 and 6, approximately 131 mils, or 3.3 millimeters on the longest edge.

Figure 9:
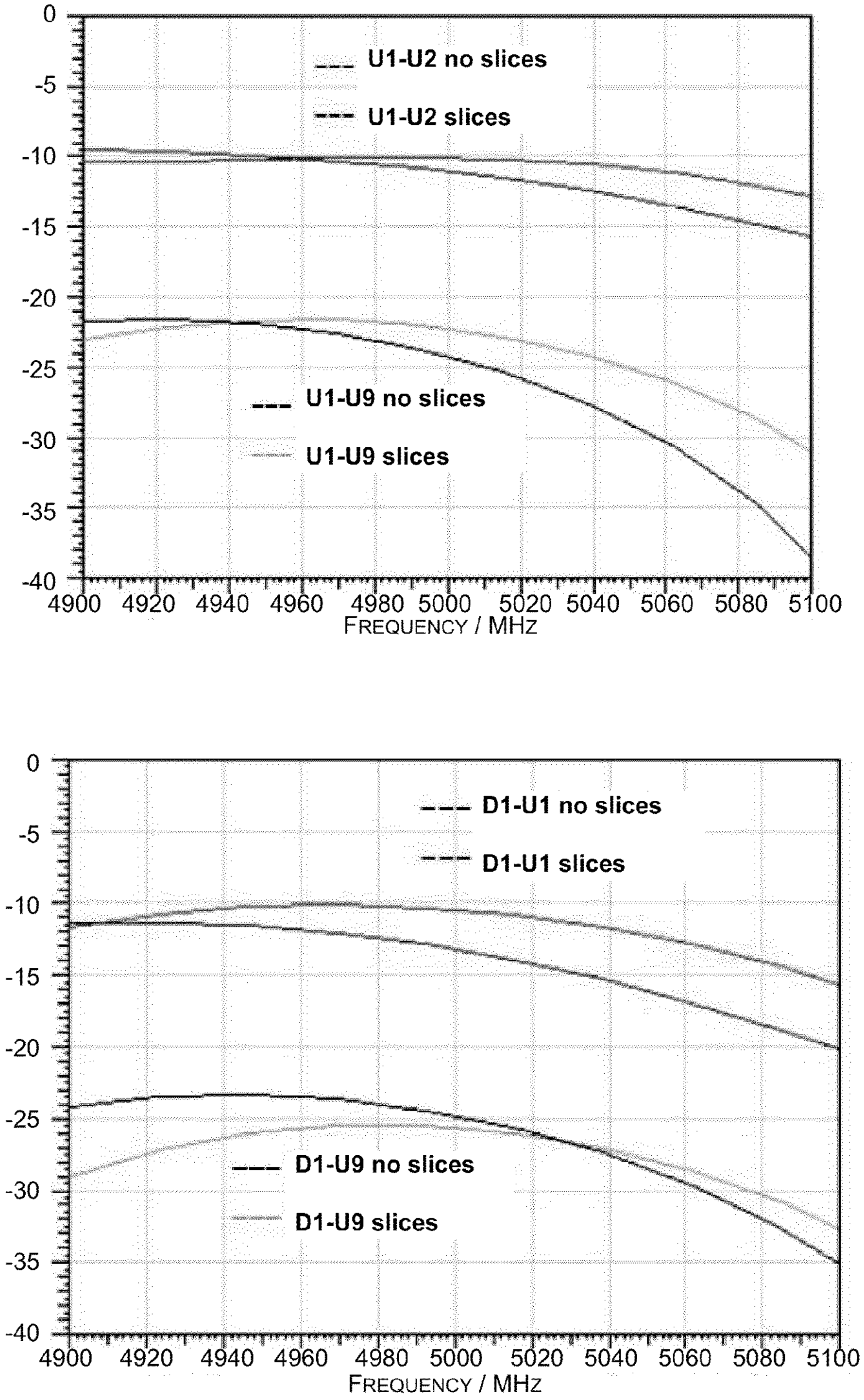
FIG. 9 is a diagram of exemplary RF scattering parameters for stamp style and sandwich style RFCOA readers.

For purposes of simulation, i.e., the transmission response versus frequency in the scattering parameters is illustrative of how much power is received by a receiver antenna element from the RF energy transmitted by a transmitter antenna element. For example, when antenna element "1" 202 acts as a transmitting source and antenna element "2" 806 acts as the receiving source, the $s_{2,1}$-parameter is being analyzed. The transmission responses between two antenna elements in the near-field presence of various RFCOA instances 102 were compared. An array of antenna elements 202 of a "stamp" style scanner 402 as shown in FIG. 4, was used with metal objects serving as the RF interactive agent 105 present in free space near the top surface. FIG. 9 shows the s-parameter for antennae couplings enumerated as in FIG. 8 and denoted "D" for the arrays placed above the RF interactive agent 105 of the RFCOA instance 102 and "U" for the arrays placed under the RF interactive agent 105 of the RFCOA instance 102. Approximately a 5 dB displacement was observed in the s-parameters for two antennae couplings for both "stamp" 402 and "sandwich" 404 types of readers.

In another implementation, another exemplary array of antenna elements 202 consists of 50 of the antenna elements (five rows and ten columns) as previously shown in FIG. 2. In one implementation, this exemplary array 200 is fabricated on RF60 substrate with a total thickness of 62 mils. Fifty edge-mount RF coaxial connectors are connected to the ends of the feedlines 628 of the antenna elements 202. In one example RFCOA reader 106, transmission measurements of the antenna elements 202 are performed using an Agilent 8753E vector network analyzer (Agilent Technologies, Inc., Santa Clara, Calif.). Calibrations may be performed to the end of the coaxial cables. The $s_{2,1}$-parameter is obtained for many antennae couplings.

Sample Performance of Exemplary Scanners

Sample results are presented for quantifying the sensitivity of obtaining RFCOA electromagnetic fingerprints with respect to slight misalignment of an RFCOA instance 102 with respect to the array 200 of antenna elements. Sample results are also presented for estimating the entropy of an RFCOA electromagnetic fingerprint as obtained by the RFCOA verifier 142.

Figure 10:
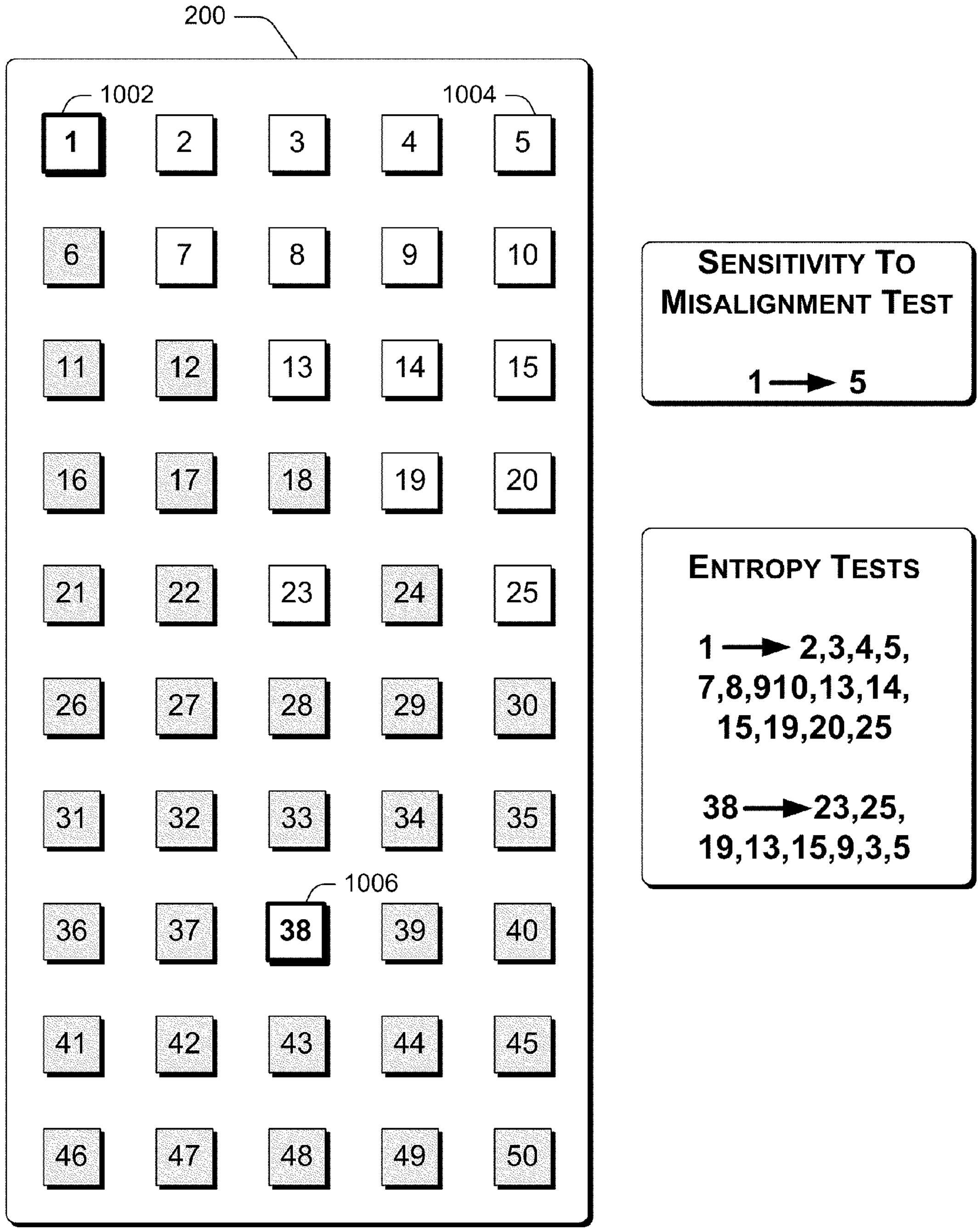
FIG. 10 is a diagram of exemplary antenna element couplings for testing alignment and entropy of an RFCOA.

FIG. 10 illustrates exemplary sets of antennae couplings active for the results sampling. For example, antenna elements "1" 1002 and "5" 1004 were used as a transmitter/receiver pair for evaluating sensitivity to misalignment when reading an RFCOA's electromagnetic fingerprint. For estimating the entropy of an RFCOA electromagnetic fingerprint, antenna elements "1" 1002 and "38" 1006 were used as RF transmitters while a range of other antenna elements were used as receivers: that is, for antenna element "1" 1002, the receiving antenna elements were 2-5, 7-10, 13-15, 19-20, and 25; and for antenna element "38" 1006 the receiving antenna elements were 23, 25, 19, 13, 15, 9, 3, and 5.

Figure 11:
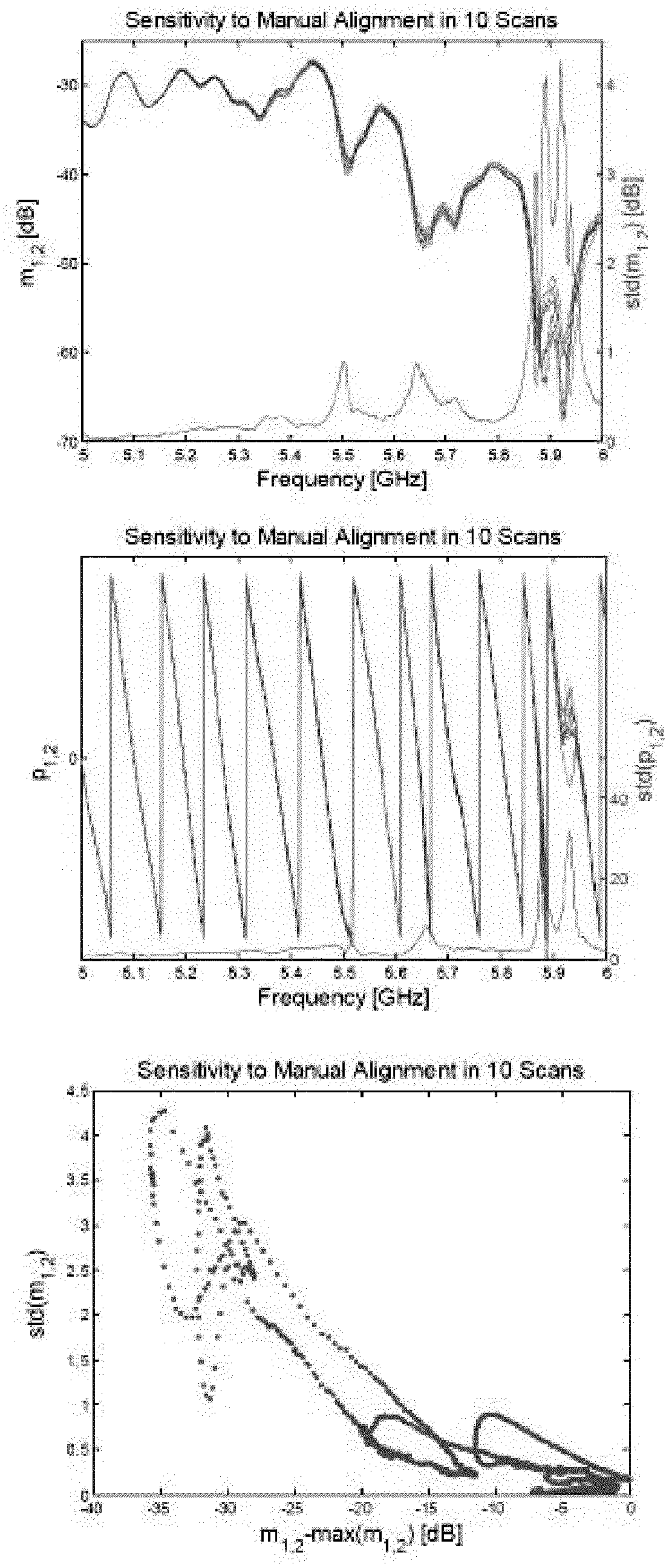
FIG. 11 is a set of diagrams of RFCOA sensitivity to minor misalignment with respect to an array of antenna elements.

For a positioning precision with tolerance in the order of 1 mm across insertions and removals of an RFCOA instance 102 to and from an RFCOA reader 106, FIG. 11 shows the actual values and standard variation of the resulting readings for the magnitude $m_{1,2}$ and phase $p_{1,2}$ of the complex response $s_{1,2}$. At lower frequencies and higher transmission efficacy, the alignment variances $\sigma_m(f)^2=\mathrm{Var}[m(f)_{1,2}]$, $\sigma_p(f)^2=\mathrm{Var}[p(f)_{1,2}]$ were substantially lower. Noticeable peaks in $\sigma_m$ and $\sigma_p$ were recorded toward the lower end of signal gaps at $f=\{5.5, 5.65, [5.85, 5.95]\}$ GHz. Within the range $f\in[5.85, 5.95]$ GHz, $\sigma_m$ reached as high as 4.5 dB and the recorded response values were approximately 30 dB lower than response's peak P. Thus, in one implementation, weak response values are proportionally ignored. The fact that $\sigma_m$ was below 1.5 dB (mostly lower than 0.5 dB) for response values as low as P−20 dB, provides confidence that exemplary RFCOA readers 106 can overcome slight misalignment. In addition, slight misalignment affected the phase information even less. Further, when more precise alignment is achieved mechanically with a 0.1 mm precision, the alignment variance is significantly lower, $\sigma_m$<0.2 dB and $\sigma_p$<3.

Figure 12:
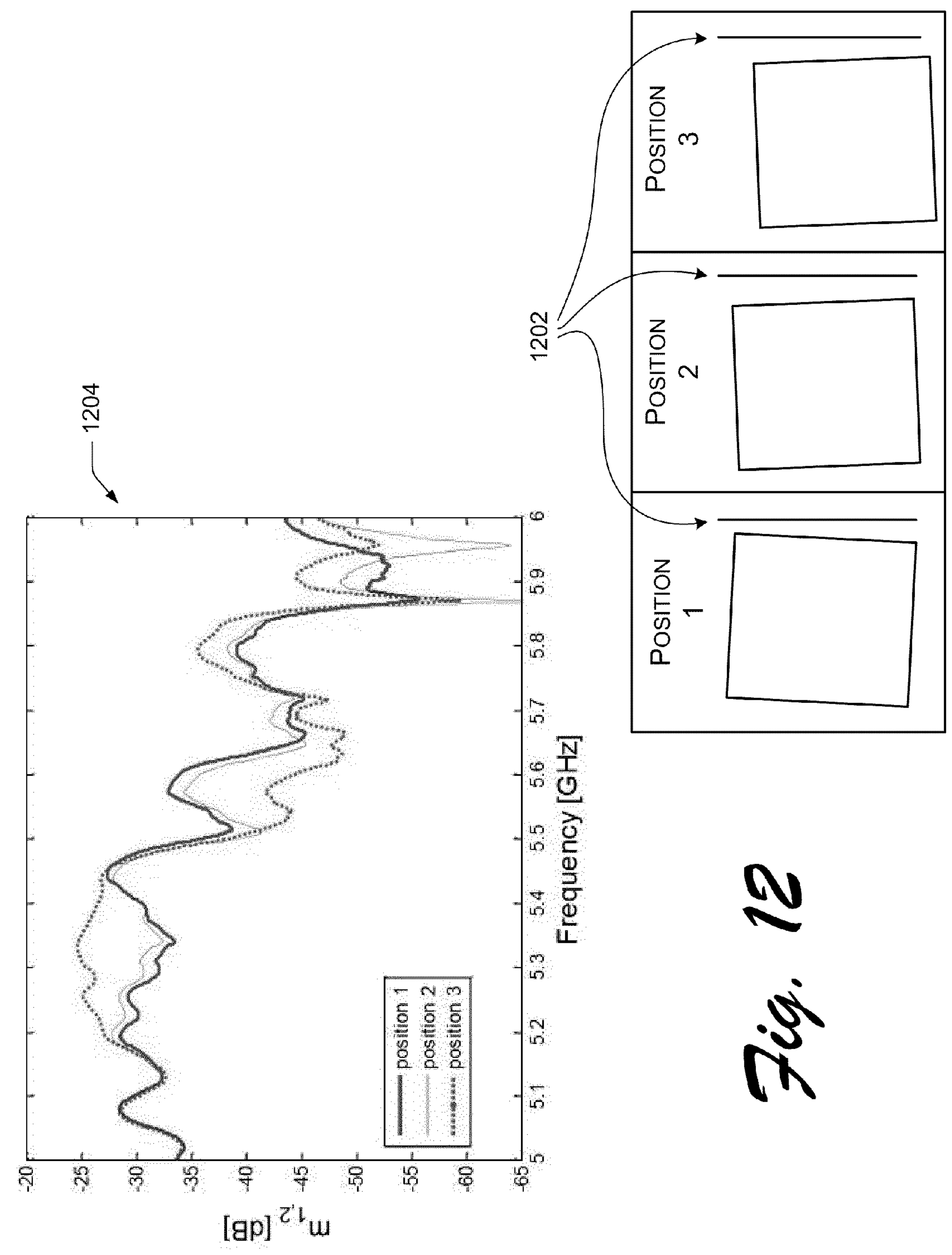
FIG. 12 is a diagram of fingerprint variation for different alignments of an RFCOA with respect to a scanning array.

FIG. 12 shows sensitivity to slightly larger misalignment than that presented in the results shown in FIG. 11. FIG. 12 shows three different m-responses to an RFCOA instance 102 positioned at three "close" positions. The "close" positions are illustrated using a reference line 1202. The slightly larger misalignments or displacements—even when on the order of 2 mm—make a significant difference in the electromagnetic fingerprint response. The differences in response caused by this "gross" misalignment can be seen in the differences of the frequency profiles in plot 1204.

Figure 13:
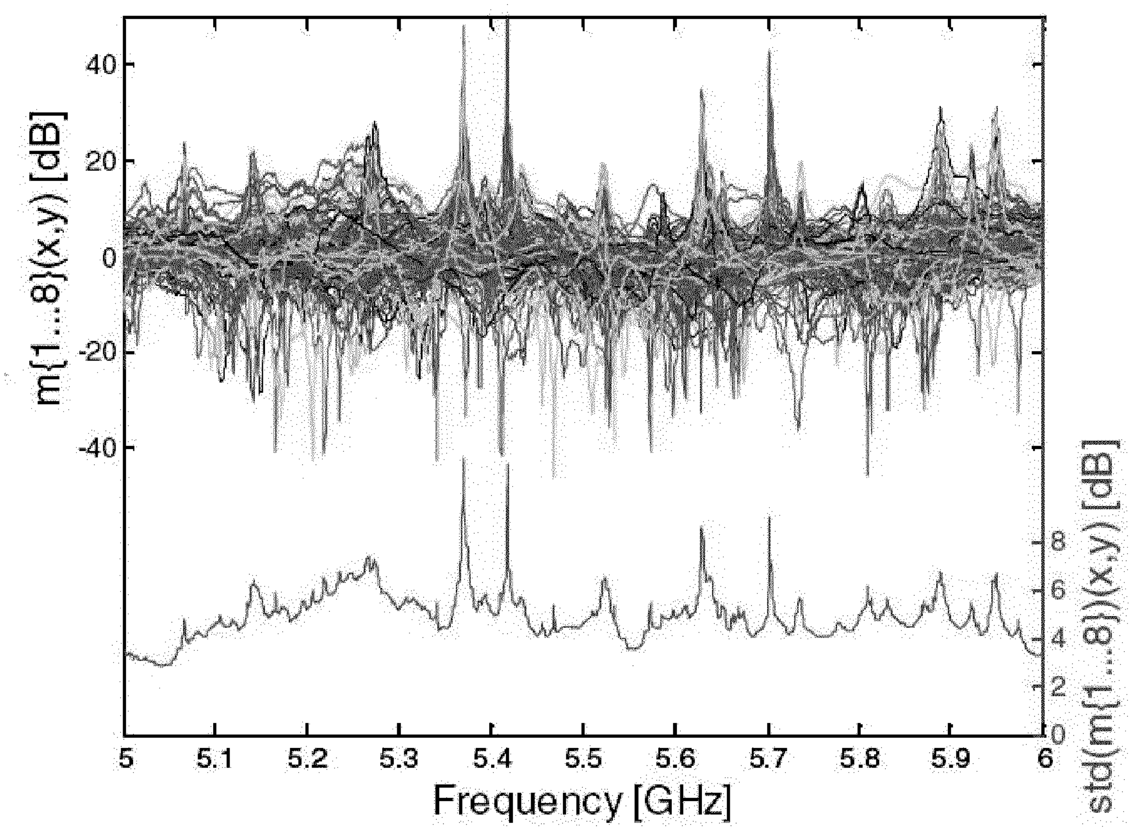
FIG. 13 is a diagram of exemplary differential responses measured between transmitting antenna elements and receiving antenna elements for testing entropy of an RFCOA.

Sample results for estimating the entropy of an RFCOA electromagnetic fingerprint as obtained by the RFCOA verifier 142 were obtained by activating antenna elements "1" 1002 and "38" 1006 as RF transmitters and a range of other antennae couplings, as mentioned above, as respective receiver antenna elements. Thus, in a fifty element array 200, a subset of 22 antennae couplings were used to obtain results, as compared to 1225 possible couplings in the array 200. Differential responses were measured between transmitting antenna elements and receiving antenna elements as illustrated in FIG. 13. Estimated probability distribution curves were computed for each antennae coupling, and the entropy of the electromagnetic fingerprint of an exemplary RFCOA 102, as obtained by an RFCOA reader 106, was estimated. In this manner, an entropy of 53832 bits was estimated. This entropy quantifies the likelihood of a false positive, but does not specify the difficulty of computing and manufacturing a false positive via counterfeiting.

Exemplary Methods

Figure 14:
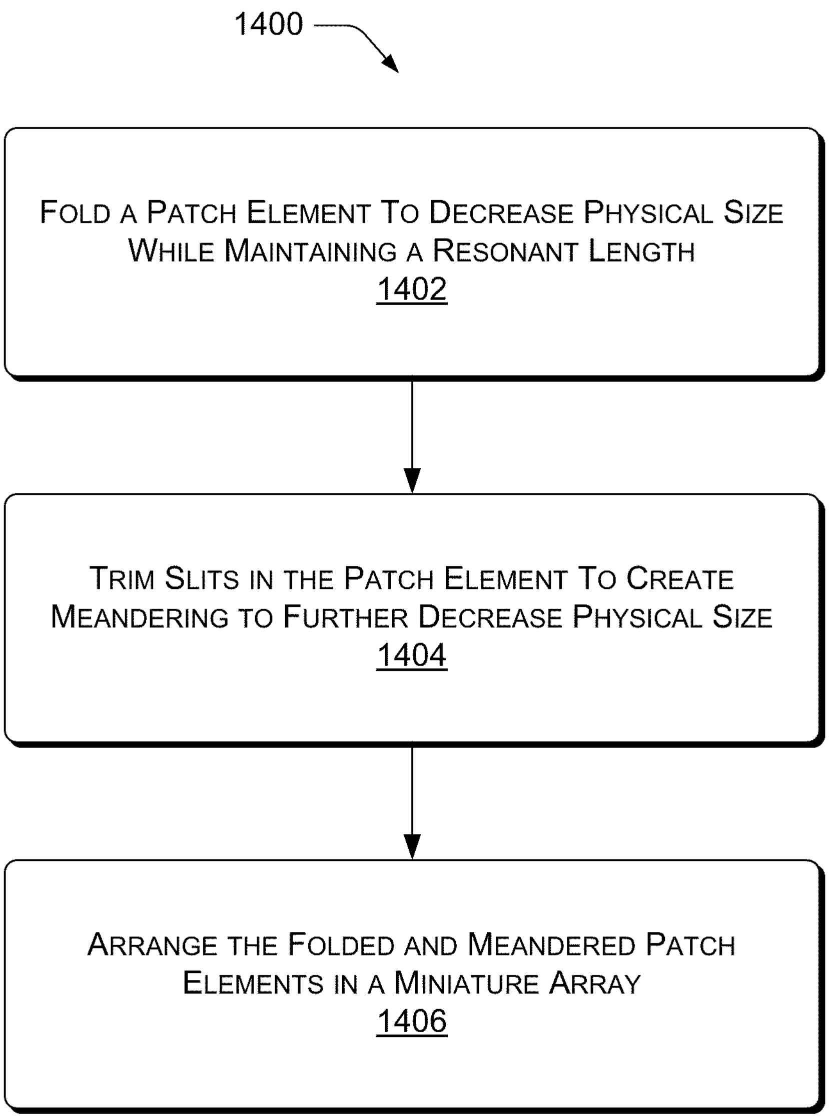
FIG. 14 is a flow diagram of an exemplary method of making a miniature antenna element for reading an RFCOA.

FIG. 14 shows an exemplary method 1400 of making a miniaturized array of antenna elements for reading an RFCOA. In the flow diagram, the operations are summarized in individual blocks.

At block 1402, a patch antenna element is folded to decrease physical size while maintaining a resonant length. In one implementation, a patch element with a resonant length of $\lambda_0/2$ is folded (e.g., by connecting vias) such that the resonant length is halved to $\lambda_0/4$. When multiple patch elements and a ground plane are folded, and connected together in the process, the physical length of the antenna element can be decreased to $\lambda_0/8$ while the resonant length is maintained at $\lambda_0/4$.

At block 1404, slits are trimmed in the patch antenna element to introduce meandering to decrease physical size while maintaining the resonant length. To obtain the same resonant frequency, a short patch with slits resonates at the same frequency as a physically longer patch without slits. In one implementation, the meandering is accomplished by forming slits in the non-radiating edges of the antenna patches. In the case of patches with trimmed slits, the resonant length is longer due to the slits in the design. Thus to operate the patch with slits at the same frequency as the patch without slits, the physical length of the patch with slits can be made smaller.

At block 1406, a plurality of the folded and meandered patch antenna elements are arranged in a miniature array. The size of the array depends on the size of the RFCOA to be used. The miniature array is used as part of an RFCOA reader in which RF energy is transmitted at the RFCOA via a subset of the antenna elements of the miniature array while electromagnetic effects representing an electromagnetic fingerprint of the RFCOA are received back from the RFCOA via a second subset of the antenna elements of the array.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A credit card comprising:

an embedded radio frequency certificate of authenticity (RFCOA), the RFCOA comprising an agent to interact with radio frequency (RF) energy such that an array of RF antennae elements in a credit card scanner obtains a unique electromagnetic RF fingerprint of the RFCOA in the credit card, the agent comprising randomly arranged materials affixed to the credit card that create electromagnetic effects for independent reception by each antennae element of the array by deflecting RF energy;

stored information representing the electromagnetic RF fingerprint obtained from a scan of the RFCOA for comparison with subsequent scans of the RFCOA, the electromagnetic RF fingerprint of the RFCOA including a set of scattering parameters from the deflected RF energy observable over a frequency band and independent values representing the electromagnetic effects of the deflected RF energy as received independently at each antennae element of the array;

wherein the materials of the agent being randomly arranged configures the RFCOA such that the RFCOA is uncopyable based on possession of the electromagnetic RF fingerprint alone; and wherein the stored information resides in a barcode, a magnetic strip, or a chip.

2. A credit card as recited in claim 1, further comprising another embedded RFCOA, wherein the embedded RFCOAs are independently identifiable.

3. A credit card as recited in claim 1, wherein the RFCOA comprises a three-dimensional structure embedded in a sealant.

4. A credit card as recited in claim 3, wherein the structure is formed from one or more homogeneous liquids.

5. An article of manufacture comprising:

an embedded radio frequency certificate of authenticity (RFCOA), the RFCOA comprising an agent to interact with radio frequency (RF) energy such that an array of RF antennae in a radio frequency (RF) scanner obtains a unique electromagnetic RF fingerprint of the RFCOA in the article of manufacture, the agent comprising randomly arranged materials affixed to the article of manufacture that cause correspondingly random and reproducible electromagnetic effects for independent reception by each antennae element of the array by deflecting RF energy;

stored information representing the electromagnetic RF fingerprint obtained from a scan of the RFCOA for comparison with subsequent scans of the RFCOA, the electromagnetic RF fingerprint of the RFCOA including a set of scattering parameters of deflected RF energy observable over a frequency band and values representing the electromagnetic effects of the deflected RF energy as received independently at each antennae element of the array;

wherein the materials of the agent being randomly arranged configures the RFCOA such that the RFCOA is uncopyable based on possession of the electromagnetic RF fingerprint alone; and wherein the stored information resides in a barcode, a magnetic strip, or a chip.

6. An article of manufacture as recited in claim 5, further comprising another embedded RFCOA.

7. An article of manufacture as recited in claim 6, wherein the embedded RFCOAs are independently identifiable.

8. An article of manufacture as recited in claim 6, wherein at least one of the embedded RFCOAs is sealed in packaging containing another one of the embedded RFCOAs.

9. An article of manufacture as recited in claim 5, wherein the RFCOA comprises a three-dimensional structure embedded in a sealant.

10. An article of manufacture as recited in claim 9, wherein the structure is made from one or more homogeneous liquids.

11. A method comprising:

obtaining a unique electromagnetic radio frequency (RF) fingerprint of an embedded radio frequency certificate of authenticity (RFCOA) in an article of manufacture, the RFCOA comprising an agent constructed of randomly arranged materials to interact with RF energy via an array of RF antennae in an RF scanner;

storing information representing the electromagnetic RF fingerprint obtained from a scan of the RFCOA for comparison with subsequent scans of the RFCOA, the electromagnetic RF fingerprint of the RFCOA including a set of scattering parameters representing deflected RF energy observable over a frequency band and values representing deflected RF energy transmitted for collection via the array of RF antennae to an RFCOA instance such that the electromagnetic effects are received independently at each antenna element of the array;

wherein the materials of the agent being randomly arranged configures the RFCOA such that the RFCOA is uncopyable based on possession of the electromagnetic RF fingerprint alone; and wherein the stored information resides in a barcode, a magnetic strip, or a chip.

12. A method as recited in claim 11, wherein the deflected RF energy is collected for receiving via the array of RF antennae from an RFCOA instance.

13. A method as recited in claim 11, further comprising positioning the array of antennae in a near-field of the RFCOA to verify authenticity of the RFCOA.

14. A method as recited in claim 11, further comprising obtaining unique electromagnetic RF fingerprints of two or more embedded RFCOAs in the article of manufacture.

15. A method as recited in claim 14, further comprising devaluing or decrementing one or more of the embedded RFCOAs in the article of manufacture while refraining from devaluing or decrementing at least one of the embedded RFCOAs in the article of manufacture.

16. A method as recited in claim 11, wherein the obtaining further comprises transmitting radio frequency (RF) energy at the RFCOA to create the unique electromagnetic fingerprint and receiving electromagnetic effects back from the RFCOA, the electromagnetic effects representing the unique electromagnetic fingerprint of the RFCOA.

17. A method as recited in claim 16, further comprising evaluating the electromagnetic effects received independently at each antenna element of the array to obtain the electromagnetic fingerprint of the RFCOA.

18. A method as recited in claim 16, wherein the transmitting is performed via a first subset of antenna elements of the array and the electromagnetic effects representing the unique electromagnetic fingerprint of the RFCOA are received back from the RFCOA via a second subset of the antenna elements of the same array.

19. A method as recited in claim 14, further comprising recording one or more of purchase, return, repair, or warranty transactions on the RFCOA.

* * * * *